US012328069B2

(12) United States Patent
Taniguchi et al.

(10) Patent No.: US 12,328,069 B2
(45) Date of Patent: Jun. 10, 2025

(54) DEVICE FOR CONTROLLING POWER CONVERSION CIRCUIT

(71) Applicant: Mitsubishi Electric Corporation, Tokyo (JP)

(72) Inventors: Tomoyuki Taniguchi, Tokyo (JP); Satoshi Murakami, Tokyo (JP); Akinu Nakabayashi, Tokyo (JP); Ryota Kondo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 415 days.

(21) Appl. No.: 17/927,898

(22) PCT Filed: Aug. 6, 2020

(86) PCT No.: PCT/JP2020/030209
§ 371 (c)(1),
(2) Date: Nov. 28, 2022

(87) PCT Pub. No.: WO2022/029961
PCT Pub. Date: Feb. 10, 2022

(65) Prior Publication Data
US 2023/0208300 A1 Jun. 29, 2023

(51) Int. Cl.
H02M 3/158 (2006.01)
H02M 1/00 (2007.01)
H02M 3/157 (2006.01)

(52) U.S. Cl.
CPC ......... *H02M 3/158* (2013.01); *H02M 1/0003* (2021.05); *H02M 3/157* (2013.01); *H02M 1/0032* (2021.05)

(58) Field of Classification Search
CPC .. H02M 1/0003; H02M 1/0032; H02M 3/157; H02M 3/158
See application file for complete search history.

(56) References Cited

U.S. PATENT DOCUMENTS 9,997,990 B2 * 6/2018 Komatsu ............... H02M 1/088
2013/0250636 A1 9/2013 Arimura
(Continued)

FOREIGN PATENT DOCUMENTS

JP 2010-088216 A 4/2010
JP 2012-080695 A 4/2012
(Continued)

OTHER PUBLICATIONS

Office Action issued Aug. 20, 2024 in European Patent Application No. 20 947 997.1, 8 pages.
(Continued)

Primary Examiner — Jue Zhang
(74) Attorney, Agent, or Firm — XSENSUS LLP

(57) ABSTRACT

A feedback control unit includes a controller which calculates a duty ratio for switching elements on the basis of a command value and a detection value of electrical information. A continuous/discontinuous current mode distinguishment unit includes a duty ratio increase/decrease distinguishment unit which performs distinguishment between increase and decrease in the duty ratio, and an output voltage detection value increase/decrease distinguishment unit which performs distinguishment between increase and decrease in a detection value of a voltage of second terminals. If the duty ratio has decreased and the detection value of the voltage has increased, or if the duty ratio has increased and the detection value of the voltage has decreased, the continuous/discontinuous current mode distinguishment unit determines that an operation mode is a discontinuous current mode, and feeds back a result of the determination to the feedback control unit.

20 Claims, 11 Drawing Sheets

(56) References Cited

U.S. PATENT DOCUMENTS

| | | | | |
|---|---|---|---|---|
| 2015/0244261 | A1* | 8/2015 | Toshiyuki | H02M 3/1588 |
| | | | | 323/282 |
| 2016/0141959 | A1 | 5/2016 | Murakami | |
| 2017/0250424 | A1* | 8/2017 | Tano | H01M 8/04567 |
| 2018/0034364 | A1* | 2/2018 | Nakada | H02M 3/07 |
| 2018/0097454 | A1 | 4/2018 | Komatsu | |

FOREIGN PATENT DOCUMENTS

| | | |
|---|---|---|
| JP | 2013-230073 A | 11/2013 |
| JP | 2016-100909 A | 5/2016 |
| JP | 2018-061318 A | 4/2018 |

OTHER PUBLICATIONS

Extended European Search Report issued Aug. 8, 2023 in corresponding European Patent Application No. 20947997.1, 8 pages.

J. Baek et al., "A sensorless continuous and discontinous conduction mode detection method for a synchronous converter using PWM pulse skipping," 2012 IEEE Energy Conversion Congress and Exposition (ECCE), Sep. 15, 2012, pp. 3970-3974, XP032466994, doi: 10.1109/ECCE.2012.6342161.

International Search Report and Written Opinion mailed on Oct. 20, 2020, received for PCT Application PCT/JP2020/030209, filed on Aug. 6, 2020, 8 pages including English Translation.

* cited by examiner

DEVICE FOR CONTROLLING POWER CONVERSION CIRCUIT

CROSS-REFERENCE TO RELATED APPLICATION

The present application is based on PCT filing PCT/JP2020/030209, filed Aug. 6, 2020, the entire contents of which are incorporated herein by reference.

TECHNICAL FIELD

The present disclosure relates to a device for controlling a power conversion circuit.

BACKGROUND ART

In a power conversion circuit, if a load is reduced, an operation mode of the circuit is switched from a continuous current mode to a discontinuous current mode. Operating characteristics differ and an optimal control method also differs between the continuous current mode and the discontinuous current mode, and thus a method for distinguishing two modes with high accuracy is required.

As a conventional technology, there has been a technology in which a mode distinguishment unit determines whether or not the sign of a current flowing through an inductor is inverted, on the basis of an average value of current flowing through the inductor calculated by an average current calculation unit and a difference between a local maximum value and a local minimum value of the current flowing through the inductor calculated by a peak current calculation unit. If the occurrence of the inversion is determined, a switching element is operated so as to be turned on or off according to whether power-running or regeneration is occurring (see Patent Document 1).

CITATION LIST

Patent Document

Patent Document 1: Japanese Laid-Open Patent. Publication No. 2013-230073

SUMMARY OF THE INVENTION

Problems to be Solved by the Invention

In the above Patent Document 1, distinguishment between the continuous current mode and the discontinuous current mode is performed by using a detection value of reactor current. In the case of performing distinguishment between two modes by the aforementioned method, a problem exists in that erroneous distinguishment might be performed owing to an error in a sensor for detecting a current value since a reactor current value at which the discontinuous current mode is obtained is small.

The present disclosure has been made to solve the above problem, and an object of the present disclosure is to provide a control device for a power conversion circuit, the control device being capable of performing distinguishment between a continuous current mode and a discontinuous current mode without using any detection value of reactor current.

Means for Solving the Problems

A control device for a power conversion circuit according to the present disclosure is a control device for a power conversion circuit in which switching elements and a reactor are connected between first terminals and second terminals and which performs power conversion between the first terminals and the second terminals, the control device including:
a feedback control unit including a controller which calculates a duty ratio for the switching elements on the basis of a command value and a detection value of electrical information related to the power conversion circuit; and
a continuous/discontinuous current mode distinguishment unit including
 a duty ratio increase/decrease distinguishment unit which performs distinguishment between increase and decrease in the duty ratio, and
 an output voltage detection value increase/decrease distinguishment unit which performs distinguishment between increase and decrease in a detection value of a voltage of the second terminals, wherein
if
 the duty ratio increase/decrease distinguishment unit determines that a duty ratio measured at a previous time is larger than a duty ratio measured at a present time, and
 the output voltage detection value increase/decrease distinguishment unit determines that a detection value measured at the present time is larger than a detection value measured at the previous time, or
if
 the duty ratio increase/decrease distinguishment unit determines that the duty ratio measured at the previous time is smaller than the duty ratio measured at the present time, and
 the output voltage detection value increase/decrease distinguishment unit determines that the detection value measured at the present time is smaller than
the detection value measured at the previous time, the continuous/discontinuous current mode distinguishment unit determines that an operation mode of the circuit is a discontinuous current mode, and feeds back a result of the determination to the feedback control unit.

Effect of the Invention

A control device for a power conversion circuit according to the present disclosure can perform distinguishment between a continuous current mode and a discontinuous current mode without using any detection value of reactor current.

EMBODIMENTS FOR CARRYING OUT THE INVENTION

Embodiment 1

Figure 1:
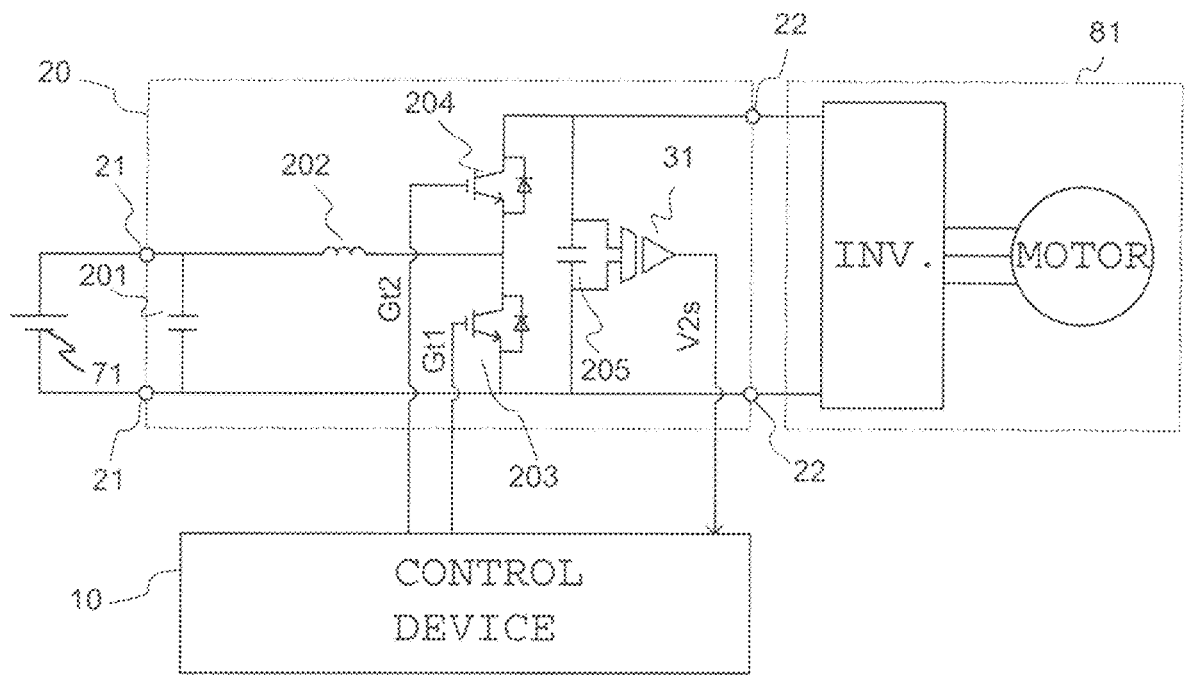
FIG. 1 is a schematic configuration diagram showing a power conversion circuit and a control device according to embodiment 1.

A power conversion circuit 20 and a control device 10 for the power conversion circuit (hereinafter, simply referred to as the control device 10) according to embodiment 1 will be described below with reference to the drawings. FIG. 1 is a schematic configuration diagram showing the power conversion circuit and the control device according to the present embodiment.

The power conversion circuit 20 includes two switching elements 203 and 204 and performs power conversion between first terminals 21 and second terminals 22. A power supply or a load is connected to the first terminals 21, and a power supply or a load is connected to the second terminals 22. In the present embodiment, a power supply 71 is connected to the first terminals 21, and a load 81 is connected to the second terminals 22. The power supply 71 is implemented by a DC power supply, and any type of power storage device or the like is used. The load 81 is implemented by an inverter and a motor.

In the present embodiment, the power conversion circuit 20 is implemented as a DC-DC converter for converting DC power. The power conversion circuit 20 is formed as a bidirectional chopper circuit in which a step-up chopper circuit for stepping up DC voltage from the first terminals 21 to the second terminals 22 and a step-down chopper circuit for stepping down DC voltage from the second terminals 22 to the first terminals 21 are combined with each other.

The power conversion circuit 20 has: a step-up function of stepping up DC power of the power supply 71 and supplying the stepped-up DC power to the inverter and the motor; and a step-down function of converting, by the inverter, AC power generated by the motor into DC power, stepping down the DC power outputted from the inverter, and supplying the stepped-down DC power to the power supply 71.

The switching elements 203 and 204 are connected in Series between the second terminal 22 on a positive electrode side and the second terminal 22 on a negative electrode side. As the switching elements, insulated gate bipolar transistors (IGBTs) to which diodes are connected in antiparallel, metal oxide semiconductor field effect transistors (MOSFETs) having functions of diodes connected in antiparallel, or the like are used. Alternatively, as the switching elements, any types of switching elements such as silicon carbide (SIC)-MOSFETs, gallium nitride (GAN)-FETs, or GAN-high electron mobility transistors (HEMTs) can also be used.

Gate drive signals Gt1 and Gt2 outputted from the control device 10 are inputted to gate terminals of the respective switching elements 203 and 204, and the switching elements 203 and 204 are turned on or off according to the respective gate drive signals Gt1 and Gt2.

The first terminal 21 on the positive electrode side is connected to a connection point between the two switching elements 203 and 204, and a reactor 202 is interposed between the first terminal 21 and the connection point. The first terminal 21 on the negative electrode side is connected to the second terminal. 22 on the negative electrode side.

A smoothing capacitor 205 on the second terminal side is provided so as to be connected in parallel to the second terminals 22. The smoothing capacitor 205 on the second terminal side is provided on the second terminal 22 side relative to the two switching elements 203 and 204.

A smoothing capacitor 201 on the first terminal side is provided so as to be connected in parallel to the first terminals 21. The smoothing capacitor 201 on the first terminal side is provided on the first terminal 21 side relative to the reactor 202.

A voltage detection circuit 31 is provided in order to detect a voltage of the second terminals 22. The voltage detection circuit 31 detects the voltage between both ends of the smoothing capacitor 205 on the second terminal side. An output signal from the voltage detection circuit 31 is inputted to the control device 10.

Figure 2:
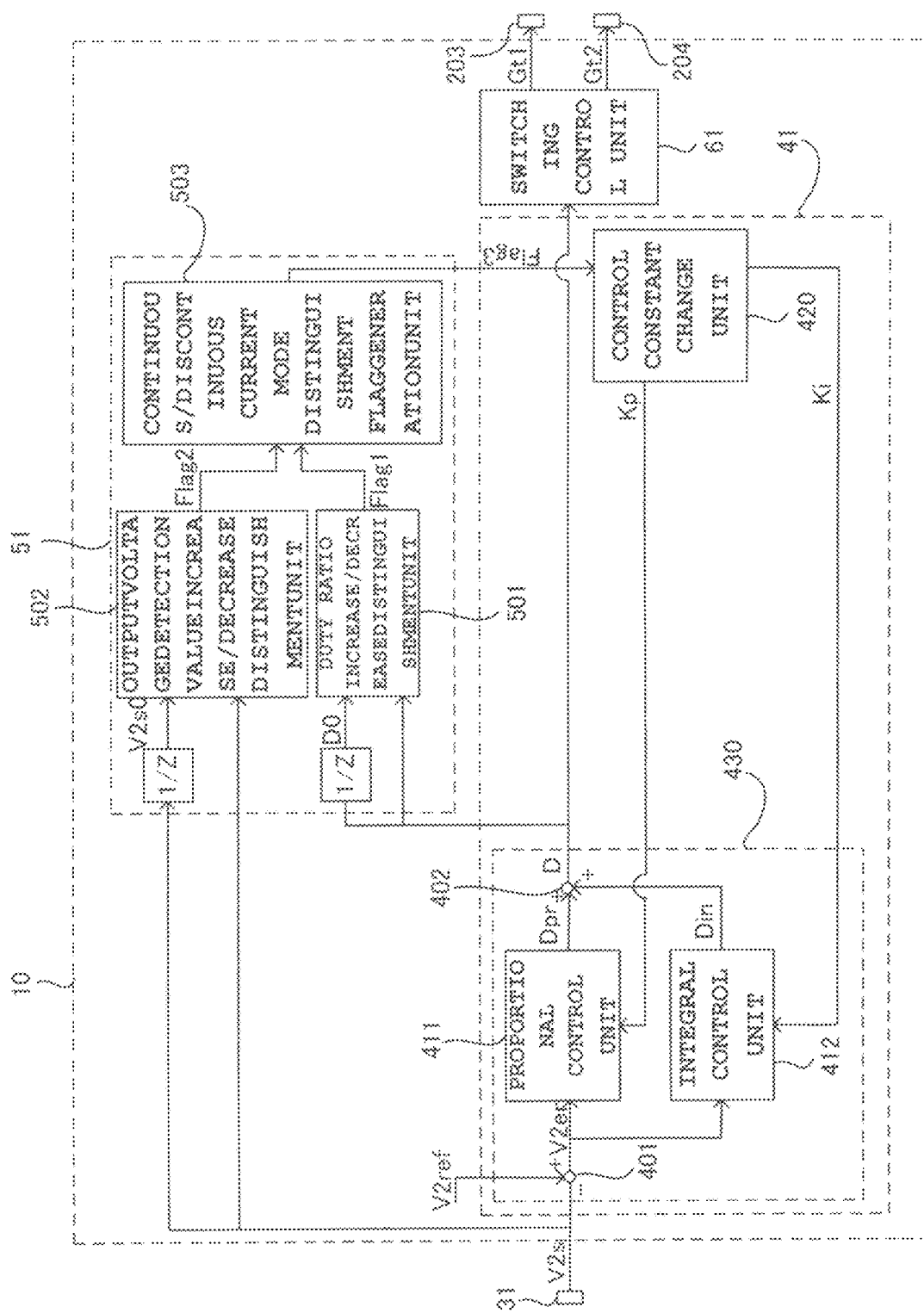
FIG. 2 is a block configuration diagram showing functions of the control device according to embodiment 1.

The control device 10 controls the power conversion circuit 20. FIG. 2 is a block configuration diagram showing functions of the control device. As shown in FIG. 2, the control device 10 includes a feedback control unit 41, a continuous/discontinuous current mode distinguishment unit 51, and a switching control unit 61 which are described later. Each function of the control device 10 will be described below in detail.

The feedback control unit 41 calculates a duty ratio D for the switching elements on the basis of a command value and a detection value of electrical information related to the power conversion circuit 20. In the present embodiment, the electrical information related to the power conversion circuit 20 is the voltage of the second terminals 22 (hereinafter, referred to as a second terminal voltage V2).

As described later, voltage, current, or power that are inputted to the first terminals 21, or current or power that are outputted from the second terminals 22, may be used as the command value and the detection value of the electrical information in the feedback control unit 41.

The feedback control unit 41 detects the second terminal voltage on the basis of the output signal from the voltage detection circuit 31 (hereinafter, a detection value of the second terminal voltage is denoted by V2s. The feedback control unit 41 includes a subtractor 401 and calculates the duty ratio D on the basis of a command value V2ref of the second terminal voltage and a detection value V2s of the second terminal voltage. The command value V2ref of the second terminal voltage may be calculated inside the control device 10 or may be transmitted from outside of the control device 10.

The subtractor 401 is provided in order to calculate a difference between the two values. The subtractor 401 subtracts the detection value V2s of the second terminal voltage from the command value V2ref of the second terminal voltage. An output signal from the subtractor 401 is inputted to a proportional control unit 411 and an integral control unit 412 as an error value V2er of the second terminal voltage.

A control constant change unit 420 changes control constants used in the proportional control unit 411 and the integral control unit 412 on the basis of a continuous/discontinuous current mode distinguishment flag Flag3 outputted from the continuous/discontinuous current mode distinguishment unit 51.

If the continuous/discontinuous current mode distinguishment flag Flag3 is ON (1), it is determined that an operation mode of the circuit is a discontinuous current mode. Then, the control constant change unit 420 outputs a proportional gain KpDCM for discontinuous current mode as a proportional gain Kp to the proportional control unit 411, and furthermore, outputs an integral gain KiDCM for discontinuous current mode as an integral gain Ki to the integral control unit 412.

If the continuous/discontinuous current mode distinguishment flag Flag3 is OFF (0), it is determined that the operation mode of the circuit is a continuous current mode. Then, the control constant change unit 420 outputs a proportional gain KpCCM for continuous current mode as the proportional gain Kp to the proportional control unit 411, and furthermore, outputs an integral gain KiCCM for continuous current mode as the integral gain Ki to the integral control unit 412.

The proportional control unit 411 stores therein the proportional gain Kp (control constant) outputted from the control constant change unit 420, and furthermore, performs proportional computation by using a previous value Kp0 of the proportional gain Kp and outputs a proportional duty ratio Dpr (hereinafter, referred to as a proportional term).

The integral control unit 412 stores therein the integral gain Ki (control constant) outputted from the control constant change unit 420, and furthermore, performs integral computation by using a previous value Ki0 of the integral gain Ki and outputs an integral duty ratio Din (hereinafter, referred to as an integral term).

An adder 402 is provided to calculate the sum of the two values, i.e., Dpr and Din. The adder 402 adds the proportional term Dpr and the integral term Din. An output signal from the adder 402 is inputted as the duty ratio D to the switching control unit 61.

In the present embodiment, the feedback control unit 41 includes a proportional integral (PI) controller 430. Instead of PI control, any type of feedback control for performing integral computation such as proportional integral differential (PID) control can also be used. In addition, any type of control such as damping control or current control can also be performed between the feedback control unit 41 and the switching control unit 61. The damping control involves subtracting, from a computation result obtained by PI control, a computation result based on a current detection value and is control for suppressing fluctuation of the duty ratio due to current fluctuation.

The switching control unit 61 turns on or off the switching elements 203 and 204 on the basis of the duty ratio D calculated by the feedback control unit 41. The switching control unit 61 generates the gate drive signals Gt1 and Gt2 for the respective switching elements 203 and 204 by pulse width modulation (PWM) control on the basis of the duty ratio D. In the present embodiment, the duty ratio D is an ON duty ratio for the switching element 203 on the negative electrode side and is an OFF duty ratio for the switching element 204 on the positive electrode side. When the switching element 203 on the negative electrode side is turned on, the switching element 204 on the positive electrode side is turned off. Between an ON period of the switching element 204 on the positive electrode side and an ON period of the switching element 203 on the negative electrode aide, a dead time during which both switching elements are turned off is provided so as not to cause short-circuit between the positive electrode side and the negative electrode side as a result of simultaneously turning on the two switching elements 203 and 204.

Figure 3:
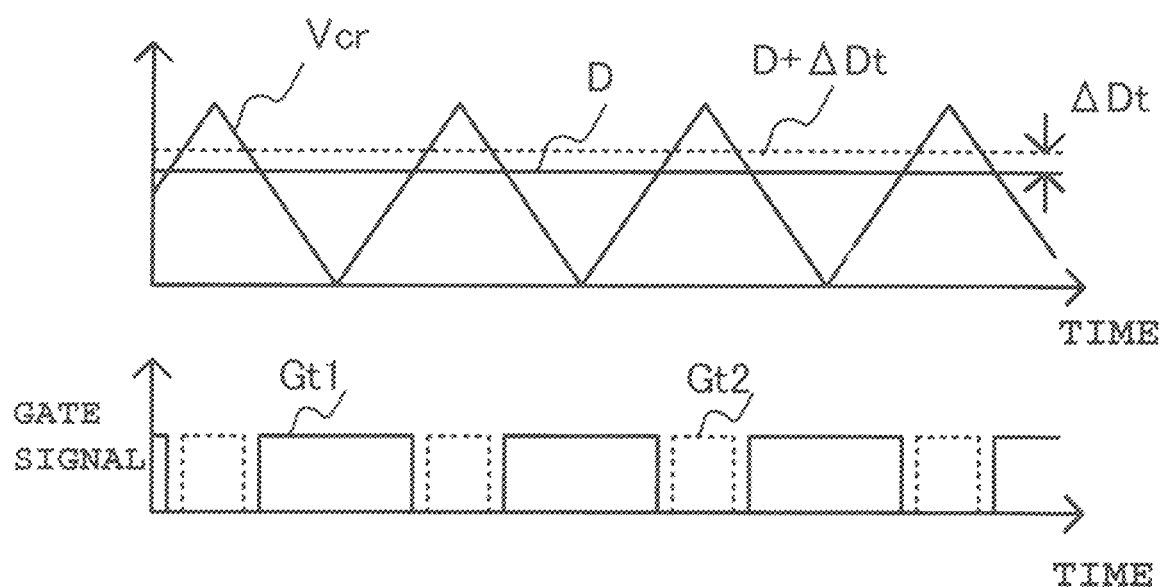
FIG. 3 is a time chart explaining ON/OFF control, for switching elements, based on a duty ratio in the control device according to embodiment 1.

FIG. 3 is a time chart explaining ON/OFF control, for the switching elements, based on the duty ratio. As shown in FIG. 3, the switching control unit 61 compares the duty ratio D and a carrier wave Vcr with each other and generates the gate drive signals Gt1 and Gt2 for the respective switching elements 203 and 204. The carrier wave Vcr is set as a triangular wave vibrating between 0 and 1 at a carrier frequency. When the duty ratio D is larger than the carrier wave Vcr, the switching control unit 61 sets the gate drive signal Gt1 for the negative electrode side so as to be high. Meanwhile, when the duty ratio D is smaller than the carrier wave Vcr, the switching control unit 61 sets the gate drive signal Gt1 for the negative electrode side so as to be low. In addition, when a duty ratio D+ΔDt obtained by adding a value ΔDt corresponding to the dead time to the duty ratio D is larger than the carrier wave Vcr, the switching control unit 61 sets the gate drive signal Gt2 for the positive electrode side so as to be low. Meanwhile, when the duty ratio D+ΔDt obtained by the addition is smaller than the carrier wave Vcr, the switching control unit 61 sets the gate drive signal Gt2 for the positive electrode side so as to be high. As the carrier wave Vcr, a saw tooth wave or a reversed saw tooth wave may be used.

Next, an operation of the continuous/discontinuous current mode distinguishment unit 51 will be described.

The following case can be contemplated. That is, unlike in the present embodiment, the continuous/discontinuous current mode distinguishment unit 51 is not provided, a current sensor is provided between the smoothing capacitor 201 on the first terminal side and the connection point between the two switching elements 203 and 204, and distinguishment between the continuous current mode and the discontinuous current mode is performed by using a detection value of current flowing through the reactor 202 (hereinafter, referred to as reactor current). In this case, erroneous distinguishment might be performed owing to an error in the current sensor.

Figure 4:
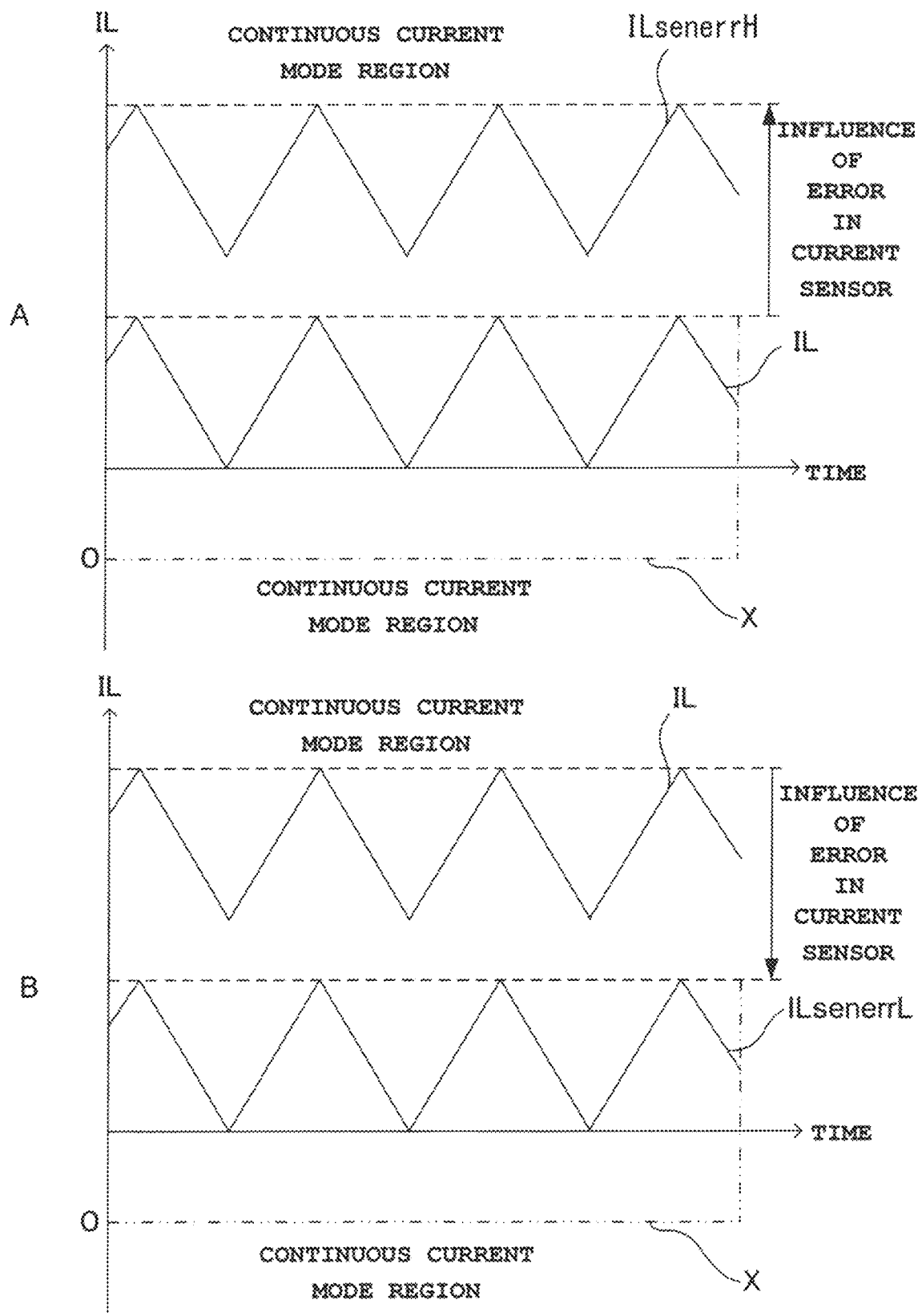
FIG. 4 is time charts each showing a behavior when an error has occurred in a current sensor in the case of performing distinguishment between a continuous current mode and a discontinuous current mode by using a detection value of reactor current.

FIG. 4 is time charts each showing a behavior when an error has occurred in the current sensor in the case in which: the continuous/discontinuous current mode distinguishment unit 51 is not provided; and distinguishment between the continuous current mode and the discontinuous current mode is performed by using a detection value of reactor current. In FIG. 4, the behavior when the error has occurred in the current sensor and erroneous distinguishment has been performed, is shown. In FIG. 4, regions X each enclosed by a two-dot chain line indicate discontinuous current mode regions.

If, owing to the error in the current sensor, a current IL actually flowing through the reactor 202 is detected as a value ILsenerrH for the continuous current mode as shown in FIG. 4A despite the fact that the current IL has a value for the discontinuous current mode, the operation mode of the circuit is determined as the continuous current mode in a distinguishment method in which a detection value of reactor current is used.

Meanwhile, if, owing to the error in the current sensor, the current IL actually flowing through the reactor 202 is detected as a value ILsenerrL for the discontinuous current mode as shown in FIG. 4B despite the fact that the current IL has a value for the continuous current mode, the operation mode of the circuit is determined as the discontinuous current mode in the distinguishment method in which a detection value of reactor current is used.

In the case in which distinguishment between the continuous current mode and the discontinuous current mode is performed by using a detection value of reactor current aw shown in FIG. 4, erroneous distinguishment might occur, owing to an error in the current sensor, near a boundary at which the operation status of the circuit becomes the discontinuous current mode.

Next, distinguishment in which no error in the current sensor occurs will be described below with use of the continuous/discontinuous current mode distinguishment unit 51 according to the present embodiment.

As shown in FIG. 2, the continuous/discontinuous current mode distinguishment unit 51 includes: a duty ratio increase/decrease distinguishment unit 501 which performs distinguishment between increase and decrease in the duty ratio D; an output voltage detection value increase/decrease distinguishment unit 502 which performs distinguishment between increase and decrease in the detection value V2s of the second terminal voltage; and a continuous/discontinuous current mode distinguishment flag generation unit 503.

The duty ratio increase/decrease distinguishment unit 501 compares a duty ratio D measured at a present time and a previous value D0 of the duty ratio with each other, and outputs a duty ratio increase/decrease distinguishment flag Flag1. If the absolute value of the difference between D and D0 is larger than a first duty ratio threshold value Dt1 and D0 is higher than D, 1 is outputted as the duty ratio increase/decrease distinguishment flag Flag1. If the absolute value of the difference between D and D0 is larger than the first duty ratio threshold value Dt1 and D0 is smaller than D, −1 is outputted as the duty ratio increase/decrease distinguishment flag Flag1. If the absolute value of the difference between D and D0 is smaller than the first duty ratio threshold value Dt1, 0 is outputted as the duty ratio increase/decrease distinguishment flag Flag1.

The output voltage detection value increase/decrease distinguishment unit 502 compares a detection value V2s, of the second terminal voltage, measured at a present time and a previous value V2s0 of the detection value of the second terminal voltage with each other. And the output voltage detection value increase/decrease distinguishment unit 502 outputs an output voltage detection value increase/decrease distinguishment flag Flag2. If the absolute value of the difference between V2s and V2s0 is larger than a first output voltage threshold value Vt1 and V2s is larger than V2s0, 1 is outputted as the output voltage detection value increase/decrease distinguishment flag Flag2. If the absolute value of the difference between V2s and V2s0 is larger than the first output voltage threshold value Vt1 and V29 is smaller than V2s0, −1 is outputted as the output voltage detection value increase/decrease distinguishment flag Flag2. If the absolute value of the difference between V2s and V2s0 is smaller than the first output voltage threshold value Vt1, 0 is outputted as the output voltage detection value increase/decrease distinguishment flag Flag2.

In the case in which both the duty ratio increase/decrease distinguishment flag Flag1 and the output voltage detection value increase/decrease distinguishment flag Flag2 are 1 or −1, the continuous/discontinuous current mode distinguishment flag generation unit 503 determines that the operation status of the circuit is the discontinuous current mode, and sets the continuous/discontinuous current mode distinguishment flag Flag3 to be 1 (ON). In the other cases, the continuous/discontinuous current mode distinguishment flag generation unit 503 determines that the operation mode of the circuit is the continuous current mode, and sets the continuous/discontinuous current mode distinguishment flag Flag3 to be 0 (OFF).

In the above configuration, distinguishment between the continuous current mode and the discontinuous current mode can be performed without using any detection value of reactor current.

The continuous/discontinuous current mode distinguishment flag Flag3 generated by the continuous/discontinuous current mode distinguishment flag generation unit 503 is inputted to the feedback control unit 41, and the control constant change unit 420 decides the proportional gain Kp and the integral gain Ki.

Figure 5:
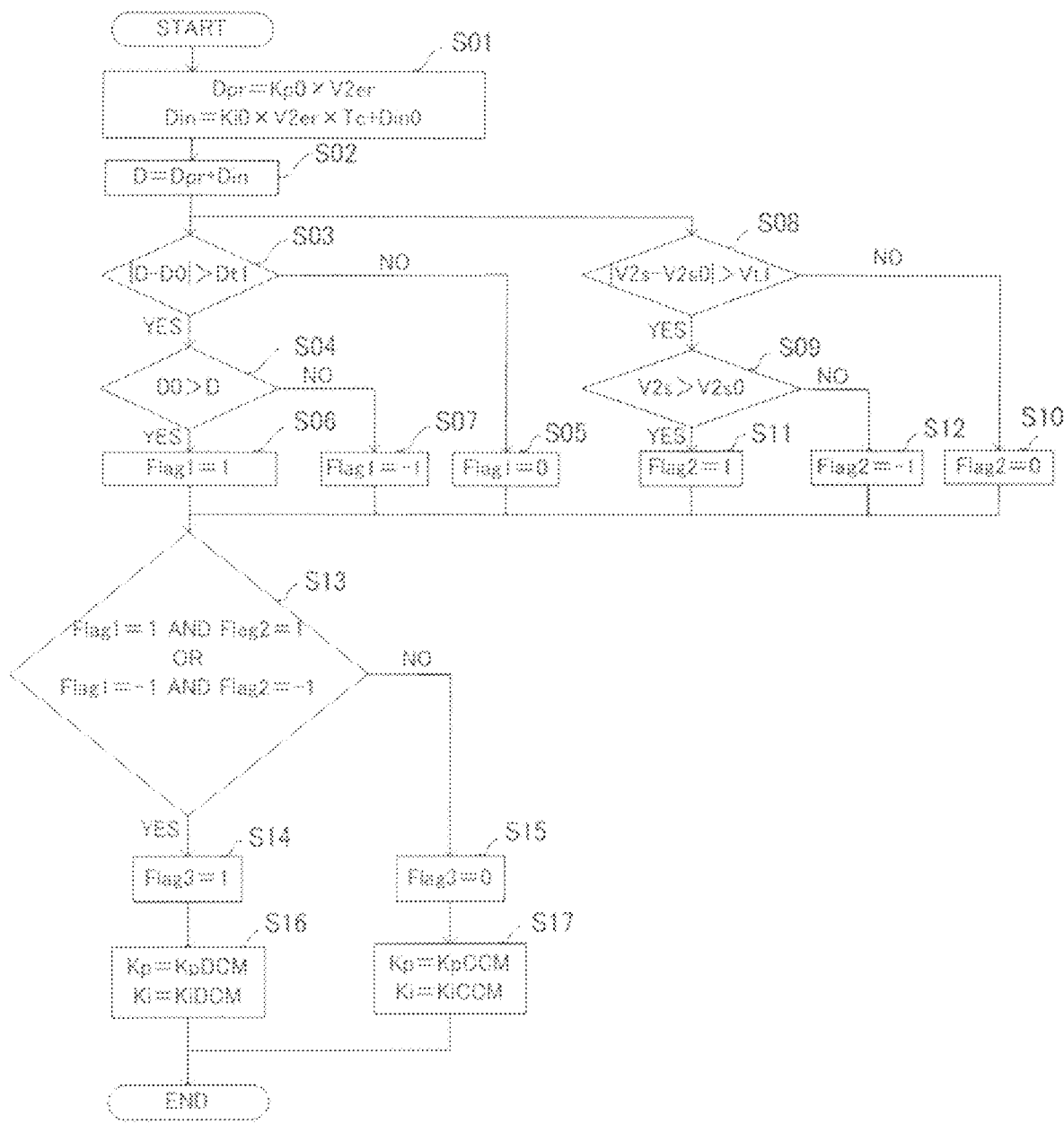
FIG. 5 is a flowchart explaining continuous/discontinuous current mode distinguishment and a process subsequent to the distinguishment, in the control device according to embodiment 1.

FIG. 5 is a flowchart showing: a continuous/discontinuous current mode distinguishment process performed by the continuous/discontinuous current mode distinguishment unit 51 according to the present embodiment; and a process that is performed by the control constant change unit 420 and that is subsequent to the distinguishment.

In FIG. 5, in step S01, the proportional control unit 411 multiplies the previous value Kp3 of the proportional gain Kp and the error value V2er of the second terminal voltage, and outputs the proportional term Dpr. Further, the integral control unit 412 adds a previous value Din0 of the integral term and a value obtained by multiplying the previous value Ki0 of the integral gain Ki, the error value V2er of the second terminal voltage, and a control cycle Tc, and outputs the present value Din of the integral term.

In step S02, the adder 402 adds the proportional term Dpr and the integral term Din, and outputs the duty ratio D.

In step S03, the continuous/discontinuous current mode distinguishment unit 51 calculates the absolute value of the difference between the duty ratio D and the previous value D0 of the duty ratio. If the absolute value is determined to be larger than the first duty ratio threshold value Dt1, the process is advanced to step S04. Meanwhile, if the absolute value is determined to be smaller than the first duty ratio threshold value Dt1, the process is advanced to step SOS.

In step S04, the continuous/discontinuous current mode distinguishment unit 51 checks the relationship in magnitude between the duty ratio D and the previous value DO of the duty ratio. If D0 is larger than D, the process is advanced to step S06. Meanwhile, if D0 is smaller than D, the process is advanced to step S07.

In step SOS, the duty ratio increase/decrease distinguishment unit 501 in the continuous/discontinuous current mode distinguishment unit 51 sets the duty ratio increase/decrease distinguishment flag Flag1 to be 0.

In step S06, the duty ratio increase/decrease distinguishment unit 501 sets the duty ratio increase/decrease distinguishment flag Flag1 to be 1.

In step S07, the duty ratio increase/decrease distinguishment unit 501 sets the duty ratio increase/decrease distinguishment flag Flag1 to be −1.

In step S08, the continuous/discontinuous current mode distinguishment unit 51 calculates the absolute value of the difference between the detection value V2s of the second terminal voltage and the previous value V2s0 of the detection value of the second terminal voltage. If the absolute value is determined to be larger than the first output voltage threshold value Vt1, the process is advanced to step S09. Meanwhile, if the absolute value is determined to be smaller than the first output voltage threshold value Vt1, the process is advanced to step S10.

In step S09, the continuous/discontinuous current mode distinguishment unit 51 checks the relationship in magnitude between the detection value V2s of the second terminal voltage and the previous value V2s0 of the detection value of the second terminal voltage. If V2s is larger than V2s0, the process is advanced to step S11. Meanwhile, if V2s is smaller than V2s0, the process is advanced to step S12.

In step S10, the output voltage detection value increase/decrease distinguishment unit 502 in the continuous/discontinuous current mode distinguishment unit 51 sets the output voltage detection value increase/decrease distinguishment flag Flag2 to be 0.

In step S11, the output voltage detection value increase/decrease distinguishment unit 502 sets the output voltage detection value increase/decrease distinguishment flag Flag2 to be 1.

In step S12, the output voltage detection value increase/decrease distinguishment unit 502 sets the output voltage detection value increase/decrease distinguishment flag Flag2 to be −1.

In step S13, whether the operation Mode of the circuit is the continuous current mode or the discontinuous current mode is determined on the basis of: the duty ratio increase/decrease distinguishment flag Flag1 decided in step S06, step S07, or step S05; and the output voltage detection value increase/decrease distinguishment flag Flag2 decided in step S11, step S12, or step S10. In the case in which both the duty ratio increase/decrease distinguishment, flag Flag1 and the output voltage detection value increase/decrease distinguishment flag Flag2 are 1 or −1, the operation status of the circuit is determined to be the discontinuous current mode, and the process is advanced to step S14. In the other cases, the operation status of the circuit is determined to be the continuous current mode, and the process is advanced to step S15.

In step S14, the continuous/discontinuous current mode distinguishment flag generation unit 503 in the continuous/discontinuous current mode distinguishment unit 51 sets the continuous/discontinuous current mode distinguishment flag Flag3 to be 1 (ON), and the process is advanced to step S16.

In step S15, the continuous/discontinuous current mode distinguishment flag generation unit 503 sets the continuous/discontinuous current mode distinguishment flag Flag3 to be 0 (OFF), and the process is advanced to step S17.

In step S16, the control constant change unit 420 outputs the proportional gain KpDCM for the discontinuous current mode as the proportional gain Kp to the proportional control unit 411, and outputs the integral gain KiDCM for the discontinuous current mode as the integral gain Ki to the integral control unit 412. The proportional gain KpDCM for the discontinuous current mode and the integral gain KiDCM for the discontinuous current mode are decided so as to obtain the highest responsiveness while guaranteeing stability of control, when the operation mode of the circuit is the discontinuous current mode. Ordinarily, the proportional gain KpDCM for the discontinuous current mode and the integral gain KiDCM for the discontinuous current mode are set to so as to become values larger than the proportional gain KpCCM for the continuous current mode and the integral gain KiCCM for the continuous current mode described later.

In step S17, the control constant change unit 420 outputs the proportional gain KpCCM for the continuous current mode as the proportional gain Kp to the proportional control unit 411, and outputs the integral gain KiCCM for the continuous current mode as the integral gain Ki to the integral control unit 412. The proportional gain KpCCM for the continuous current mode and the integral gain KiCCM for the continuous current mode are decided so as to obtain the highest responsiveness while guaranteeing stability of control, when the operation mode of the circuit is the continuous current mode.

The first duty ratio threshold value Dt1 is set to become a value larger than a maximum value of a change, in the duty ratio D, that occurs per one control cycle Tcnt upon a sudden change of the circuit at a maximum speed in the case in which the power conversion circuit 20 is in the continuous current mode.

The first output voltage threshold value Vt1 is set to become a value larger than a pulsation, of the second terminal voltage V2, that occurs when the power conversion circuit 20 is performing a steady operation. Or the first output voltage threshold value Vt1 is set to become a value larger than a maximum value of a change, in V2, that occurs per one control cycle Tcnt upon a sudden change of the circuit at the maximum speed in the case in which the power conversion 20 is in the continuous current mode.

Figure 6:
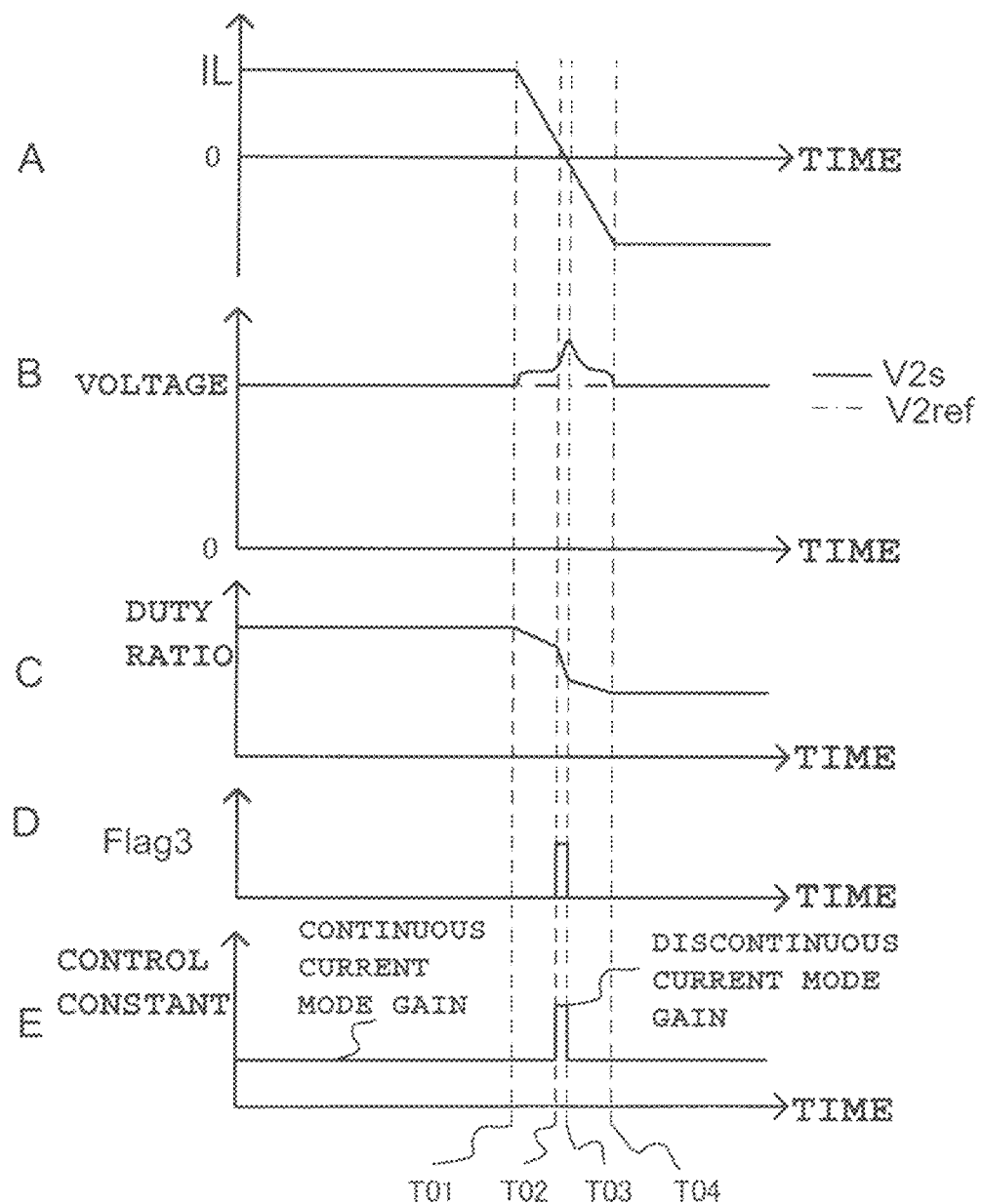
FIG. 6 is a time chart showing a behavior in continuous/discontinuous current mode distinguishment upon fluctuation in a load, in the control device according to embodiment 1, FIG. 7 as a block configuration diagram showing functions of a control device according to embodiment 2.

FIG. 6 is a time chart showing a behavior in continuous/discontinuous current mode distinguishment upon fluctuation in the load and shows a control operation upon a sudden change in the load. FIG. 6A shows the reactor current IL flowing through the reactor 202. FIG. 6B shows the detection value V2e of the second terminal voltage and the command value V2ref of the second terminal voltage. In FIG. 6B, a solid line indicates V2s which is the output voltage detection value, and an alternate long and short dash line indicates V2ref which is the output voltage command value. FIG. GC shows the duty ratio D. FIG. GD shows a timing of rising of the continuous/discontinuous current mode distinguishment flag Flag3. FIG. 6E shows changes in the control constants, i.e., the proportional gain Kp and the integral gain Ki.

In FIG. 6, the reactor current IL starts to decrease from a value for power-running at a time T01. Immediately after the time T01, the detection value V2s of the second terminal voltage starts to increase mildly, and the duty ratio D starts to mildly decrease by feedback control of the feedback control unit 41. The continuous/discontinuous current mode distinguishment flag Flag3 can be set so as not to be turned on at this time if the first duty ratio threshold value Dt1 in the duty ratio increase/decrease distinguishment unit 501 and the first output voltage threshold value Vt1 in the output voltage detection value increase/decrease distinguishment unit 502 are set according to the above method.

At a time T02, the operation mode of the circuit is changed to the discontinuous current mode, the detection value V2s of the second terminal voltage starts to increase rapidly, and the duty ratio D starts to decrease rapidly. Consequently, the continuous/discontinuous current mode distinguishment flag Flag3 is turned on, and each control constant is switched from a continuous current mode gain to a discontinuous current mode gain. At this time, the control constant may be changed at the elapse of one control cycle or may be changed at the elapse of a plurality of control cycles.

At a time T03, the reactor current breaks through the discontinuous current mode on the regeneration side. At this time, the detection value V2s of the second terminal voltage starts to decrease by feedback control of the feedback control unit 41. At a time T04, the detection value V2s returns to the command value V2ref of the second terminal voltage.

At this time, the continuous/discontinuous current mode distinguishment unit 51 may set the continuous/discontinuous current mode distinguishment flag Flag3 so as to become ON when determination that the operation mode is the discontinuous mode is made once, or may set the continuous/discontinuous current mode distinguishment flag Flag3 so as to become ON when determination that the operation mode is the discontinuous mode is made a plurality of times. That is, if determination that the operation mode is the discontinuous current mode is made at least two times, the continuous/discontinuous current mode distinguishment unit 51 can also conclude that the operation mode is the discontinuous current mode.

By configuring the power conversion device as described above, distinguishment between the continuous current mode and the discontinuous current mode can be performed without using any detection value of reactor current, whereby the distinguishment can be performed accurately. Further, the feedback control unit 41 performs feedback control on the basis of a result of this distinguishment. Therefore, the responsiveness of the power conversion circuit 20 can be increased, and the maximum value of the second terminal voltage V2 can be suppressed. Consequently, the capacitance of the smoothing capacitor 205 on the second terminal side can be decreased.

Embodiment 2

Next, a power conversion circuit and a control device according to embodiment 2 will be described with reference to the drawings. Descriptions about the same components as those in the above embodiment 1 will be omitted. The basic configuration and process of the power conversion circuit and the control device according to the present embodiment are the same as those in embodiment 1.

Figure 7:
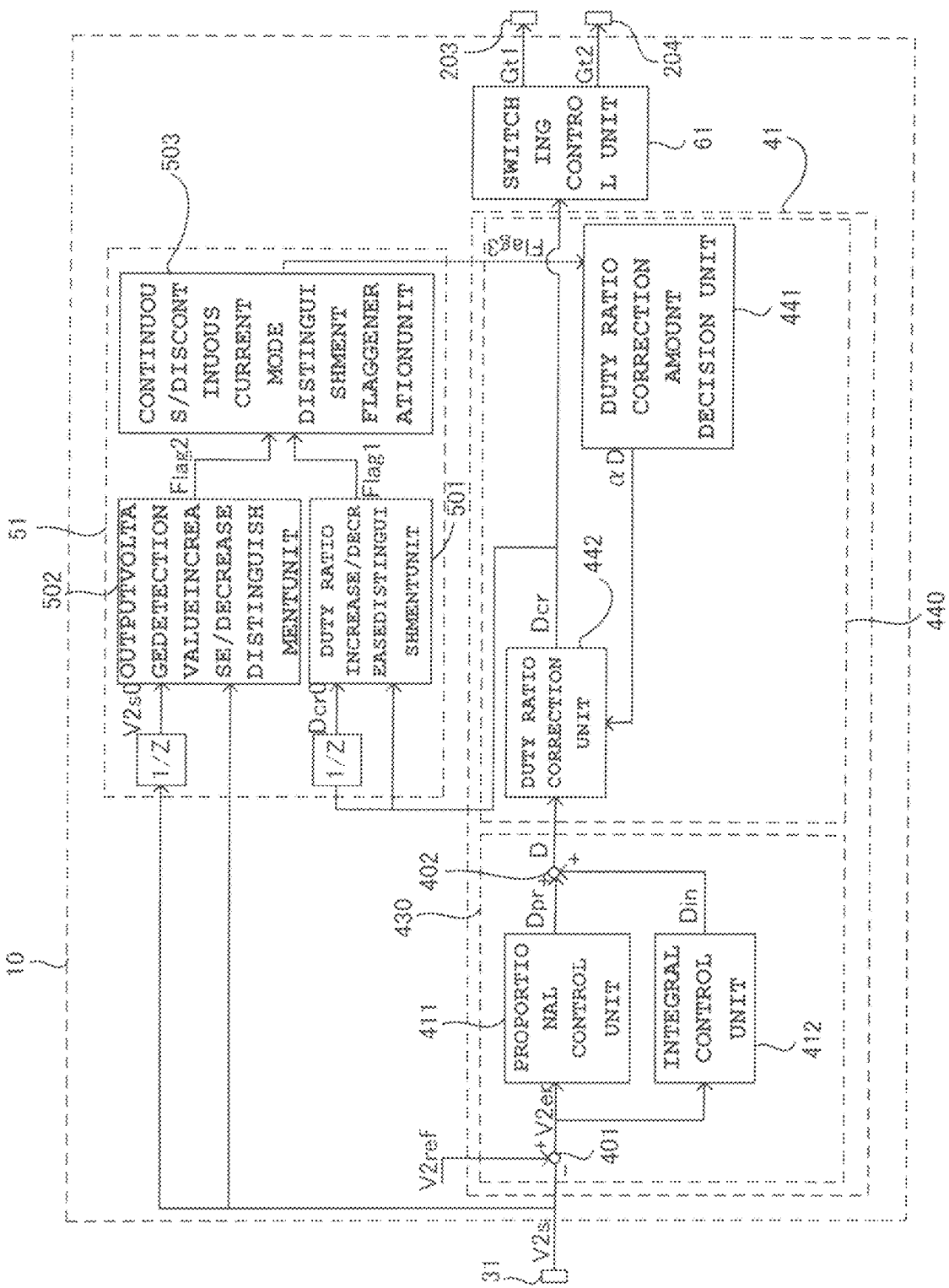

FIG. 7 is a block configuration diagram showing functions of the control device. In the present embodiment, a duty ratio correction control unit 440 which corrects the duty ratio D on the basis of a result from the continuous/discontinuous current mode distinguishment unit 51, is provided.

The duty ratio correction control unit 440 includes: a duty ratio correction amount decision unit 441 which decides a present value αD of a duty ratio correction amount on the basis of the result from the continuous/discontinuous current mode distinguishment unit 51; and a duty ratio correction unit 442 which corrects the duty ratio D and outputs a corrected duty ratio Dcr.

The duty ratio correction unit 442 stores therein the present value αD of the duty ratio correction amount. Further, the duty ratio correction unit 442 corrects the duty ratio D by multiplying the duty ratio D by a previous value αD0 of the duty ratio correction amount and outputs the corrected duty ratio Dcr to the duty ratio increase/decrease distinguishment unit 501 and the switching control unit 6.

If the previous value αD0 of the duty ratio correction amount is 1, duty ratio correction control is turned off, and D which is an output value from the PI controller 430 serves as a present duty ratio.

The duty ratio increase/decrease distinguishment unit 501 compares the corrected duty ratio Dcr and a previous value Dcr0 of the corrected duty ratio with each other and outputs a duty ratio increase/decrease distinguishment flag Flag1. If the absolute value of the difference between Dcr and Dcr0 is larger than a second duty ratio threshold value Dt2 and Dcr0 is larger than Dcr, the duty ratio increase/decrease distinguishment flag Flag1 is set to be 1. Meanwhile, if the absolute value of the difference between Dcr and Dcr0 is larger than the second duty ratio threshold value Dt2 and Dcr0 is smaller than Dcr, the duty ratio increase/decrease distinguishment flag Flag1 is set to be −1. Further, if the absolute value of the difference between Dcr and Dcr0 is smaller than the second duty ratio threshold value Dt2, 0 is outputted as the duty ratio increase/decrease distinguishment flag Flag1.

The switching control unit 61 generates the gate drive signals Gt1 and Gt2 for the respective switching elements 203 and 204 by the same means with use of the corrected duty ratio Dcr instead of the duty ratio D in the above embodiment 1.

Figure 8:
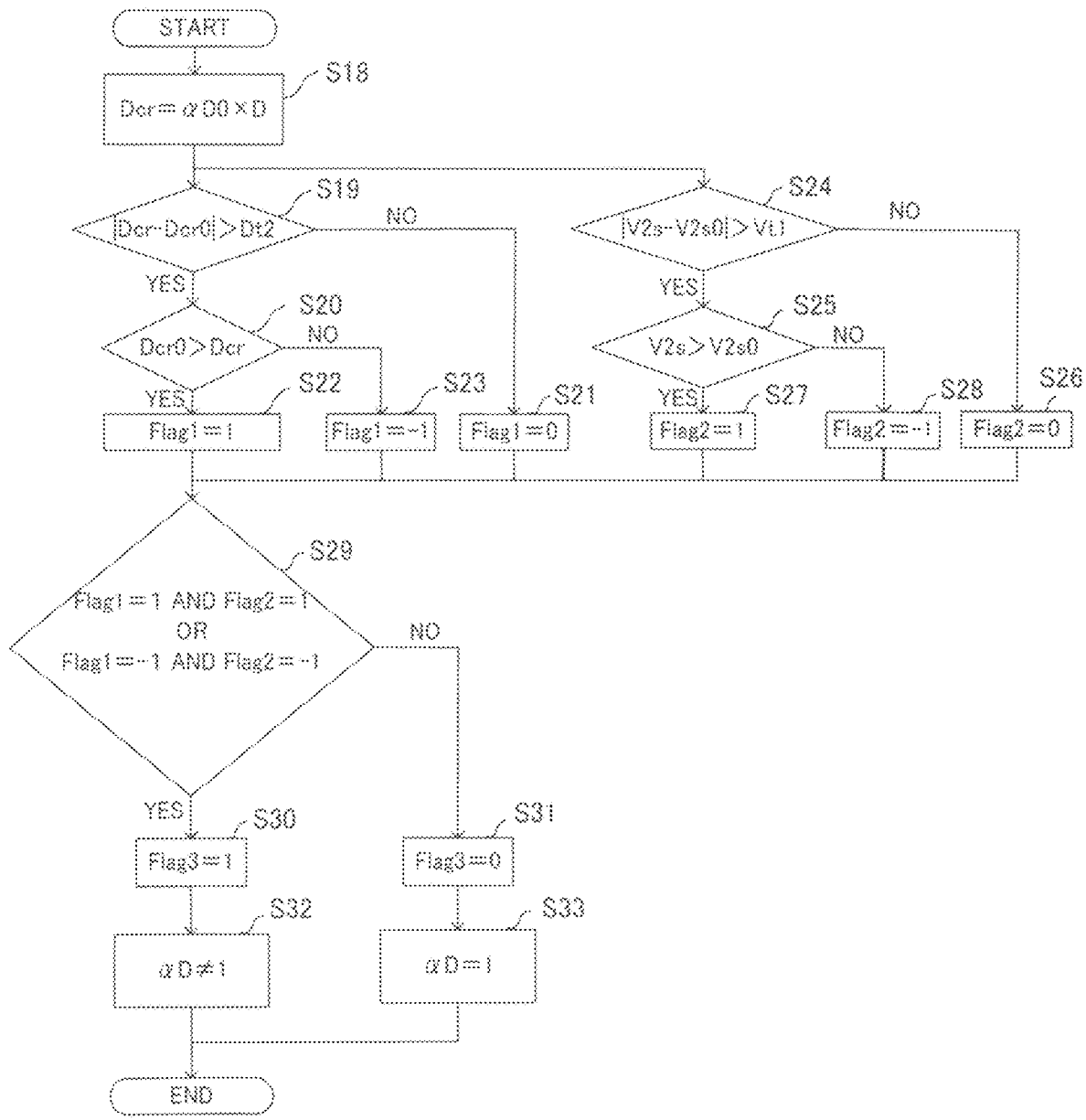
FIG. 8 is a flowchart explaining continuous/discontinuous current mode distinguishment and a process subsequent to the distinguishment, in the control device according to embodiment 2.

FIG. 8 is a flowchart explaining continuous/discontinuous current mode distinguishment and a process subsequent to the distinguishment, in embodiment 2. FIG. 8 shows: a continuous/discontinuous current mode distinguishment process performed by the continuous/discontinuous current mode distinguishment unit 51; and a process that is performed by the duty ratio correction control unit 440 and that is subsequent to the distinguishment. In FIG. 8, in step S18, the feedback control unit 41 multiplies D which is an output value from the PI controller 430 by the previous value αD0 of the duty ratio correction amount, and outputs the corrected duty ratio Dcr.

In step S19, the continuous/discontinuous current mode distinguishment unit 51 calculates the absolute value of the difference between the corrected duty ratio Dcr and the previous value Dcr0 of the corrected duty ratio. If the absolute value is determined to be larger than the second duty ratio threshold value Dt2, the process is advanced to step S20. Meanwhile, if the absolute value is determined to be smaller than the second duty ratio threshold value Dt2, the process is advanced to step S21.

In step S20, the continuous/discontinuous current mode distinguishment unit. 51 checks the relationship in magnitude between the corrected duty ratio Dcr and the previous value Dcr0 of the corrected duty ratio. If Dcr0 is larger than Dcr, the process is advanced to step S22. Meanwhile, if Dcr0 is smaller than Dcr, the process is advanced to step S23. In step S21, the duty ratio increase/decrease distinguishment unit 501 in the continuous/discontinuous current mode distinguishment unit 51 sets the duty ratio increase/decrease distinguishment flag Flag1 to be 0. In step S22, the duty ratio increase/decrease distinguishment unit 501 sets the duty ratio increase/decrease distinguishment flag Flag1 to be 1. In step S23, the duty ratio increase/decrease distinguishment unit 501 sets the duty ratio increase/decrease distinguishment flag Flag1 to be −1.

In step S24, the continuous/discontinuous current mode distinguishment unit 51 calculates the absolute value of the difference between the detection value V2s of the second terminal voltage and the previous value V2s0 of the detection value of the second terminal voltage. If the absolute value is determined to be larger than the first output voltage threshold value Vt1, the process is advanced to step S25. Meanwhile, if the absolute value is determined to be smaller than the first output voltage threshold value Vt1, the process is advanced to step S26.

In step S25, the continuous/discontinuous current mode distinguishment unit 51 checks the relationship in magnitude between the detection value V2s of the second terminal voltage and the previous value V2s0 of the detection value of the second terminal voltage. If V2s is larger than V2s0, the process is advanced to step S27. Meanwhile, if V2s is smaller than V2s0, the process is advanced to step S23.

In step S26, the output voltage detection value increase/decrease distinguishment unit 502 in the continuous/discontinuous current mode distinguishment unit 51 sets the output voltage detection value increase/decrease distinguishment flag Flag2 to be 0.

In step S22, the output voltage detection value increase/decrease distinguishment unit 502 sets the output voltage detection value increase/decrease distinguishment flag Flag2 to be 1.

In step S28, the output voltage detection value increase/decrease distinguishment unit 502 sets the output voltage detection value increase/decrease distinguishment flag Flag2 to be −1.

In step S29, whether the operation status of the circuit is the continuous current mode or the discontinuous current mode is determined on the basis of: the duty ratio increase/decrease distinguishment flag Flag1 decided in step S22, step S23, or step S21; and the output voltage detection value increase/decrease distinguishment flag Flag2 decided in step S27, step S28, or step S26. In the case in which both the duty ratio increase/decrease distinguishment flag Flag1 and the output voltage detection value increase/decrease distinguishment flag Flag2 are 1 or −1, the operation status of the circuit is determined to be the discontinuous current mode, and the process is advanced to step S30. In the other cases, the operation status of the circuit is determined to be the continuous current mode, and the process is advanced to step 931.

In step S30, the continuous/discontinuous current mode distinguishment flag generation unit 503 in the continuous/discontinuous current mode distinguishment unit 51 sets the continuous/discontinuous current mode distinguishment flag Flag3 to be 1 (ON), and the process is advanced to step S32.

In step S31, the continuous/discontinuous current mode distinguishment flag generation unit 503 sets the continuous/discontinuous current mode distinguishment flag Flag3 to be 0 (OFF), and the process is advanced to step 933.

In step S32, the duty ratio correction amount decision unit 441 outputs a duty ratio correction amount αD other than 1 to the duty ratio correction unit 442. The manner for setting the duly ratio correction amount αD will be described below.

The duty ratio correction amount αD is set to become a value larger than a maximum value of a change, in the duty ratio D, that occurs per one control cycle Tcnt with respect to a maximum speed of a circuit sudden change that occurs in the power conversion circuit 20. For example, if the mode of the load 81 is changed from a power-running mode to a regeneration mode in a state in which the second terminal voltage V2 and a first terminal voltage V1 are fixed, the duty ratio D decreases for the switching element 203 by an amount that is two times the dead time ΔDt. Meanwhile, if the mode of the load 81 is changed from the regeneration mode to the power-running mode, the duty ratio D increases for the switching element 203 by the amount that is two times the d time ΔDt. Conversion into a duty ratio is performed on the assumption that the duty ratio D changes by 2×ΔDt in one control cycle Tcnt. Consequently, a maximum value of the duty ratio correction amount αD is decided.

In step S33, the duty ratio correction amount decision unit 441 outputs 1 as the duty ratio correction amount αD to the duty ratio correction unit 442.

Figure 9:
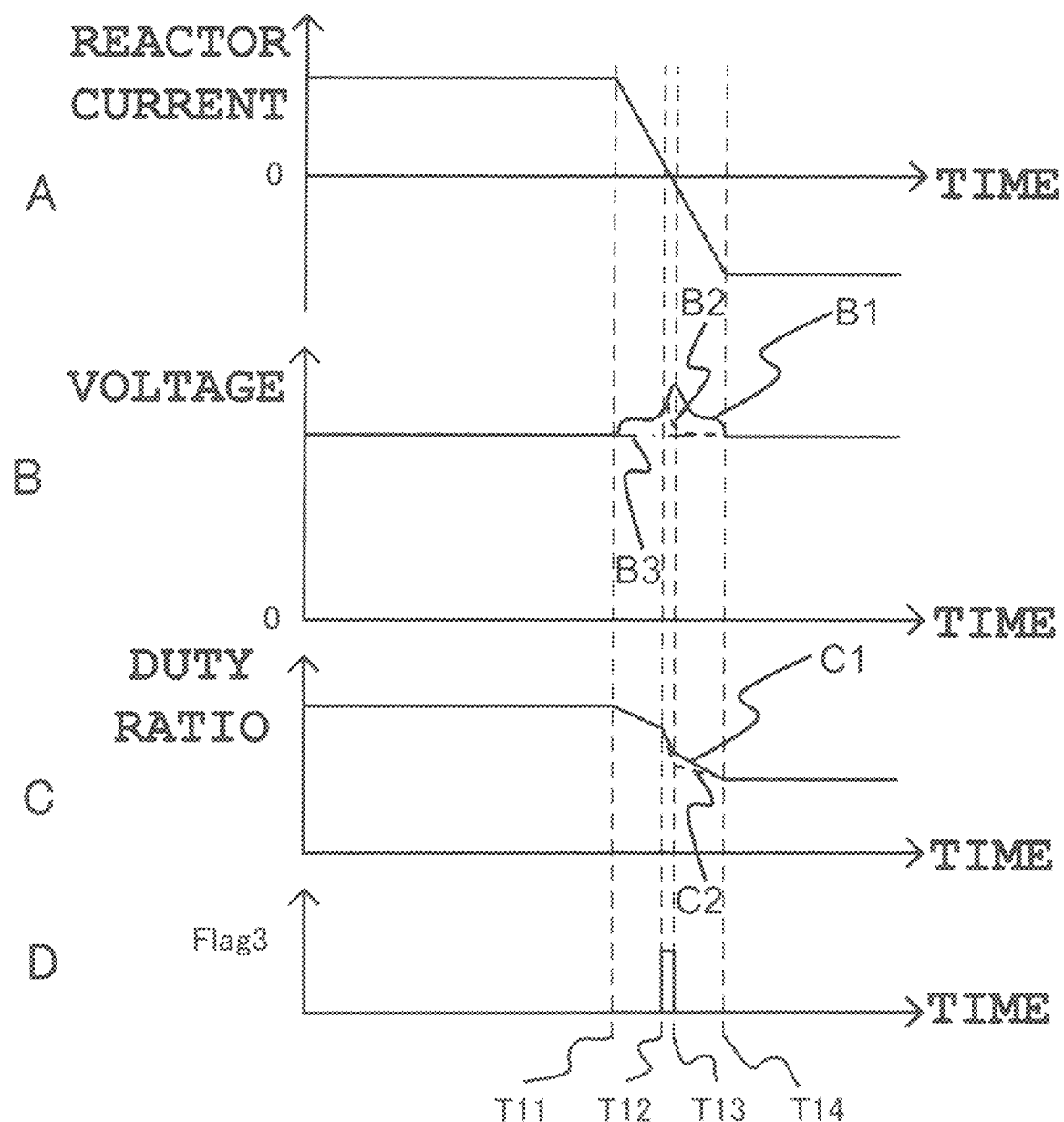
FIG. 9 is a time chart showing a behavior in continuous/discontinuous current mode distinguishment upon fluctuation in the load, in the control, device according to embodiment 2.

FIG. 9 is a time chart explaining a behavior in continuous/discontinuous current mode distinguishment upon fluctuation in the load and shows a control behavior upon a sudden change in the load. FIG. 9A shows reactor currents IL flowing through the reactor 202. FIG. 9A shows a reactor current obtained when correction control is OFF, and a reactor current obtained when correction control is ON. Both reactor currents match each other. FIG. 9B shows detection values V2s of the second terminal voltage and a command value V2ref of the second terminal voltage. In FIG. 9B, a solid line B1 indicates an output voltage detection value obtained when correction control is OFF, a dotted line B2 indicates an output voltage detection value obtained when correction control is ON, and an alternate long and short dash line B3 indicates an output voltage command value. FIG. 9C shows duty ratios D. In FIG. 9C, a solid line C1 indicates a duty ratio D obtained when correction control is OFF, and a dotted line C2 indicates a duty ratio obtained when correction control is ON. FIG. 9D shows a timing of rising of the continuous/discontinuous current mode distinguishment flag Flag3.

In FIG. 9, the reactor current IL starts to decrease from a value for power-running at a time T11. Immediately after the time T11, the detection value V2s of the second terminal voltage Starts to increase mildly, and the duty ratio D starts to mildly decrease by feedback control of the feedback control unit 41. The continuous/discontinuous current mode distinguishment flag Flag3 can be set not to be turned on at this time if the second duty ratio threshold value Dt2 in the duty ratio increase/decrease distinguishment unit 501 and the first output voltage threshold value Vt1 in the output voltage detection value increase/decrease distinguishment unit 502 are set in the same manner as in the above embodiment 1.

At a time T12, the operation status of the circuit is changed to the discontinuous current mode, the detection value V2s of the second terminal voltage starts to increase rapidly, and the duty ratio D starts to decrease rapidly. Consequently, the continuous/discontinuous current mode distinguishment flag Flag3 is turned on, and the duty ratio correction control is turned on. As a result, the detection value V2s of the second terminal voltage starts to decrease immediately.

At a time T13, the reactor current IL breaks through the discontinuous current mode on the regeneration side. At this time, the detection value V2s of the second terminal voltage starts to decrease by feedback control of the feedback control unit 42. At a time T14, the detection value V2s returns to the command value V2ref of the second terminal voltage.

By configuring the power conversion device as described above, distinguishment between the continuous current mode and the discontinuous current mode can be performed without using any detection value of reactor current, whereby the distinguishment can be performed accurately. Further, the feedback control unit 41 performs feedback control on the basis of a result of this distinguishment. Therefore, the responsiveness of the power conversion circuit 20 can be increased, and the maximum value of the second terminal voltage V2 can be suppressed. Consequently, the capacitance of the smoothing capacitor 205 on the second terminal side can be decreased.

Embodiment 3

Next, a power conversion circuit and a control device according to embodiment 3 will be described with reference to the drawings. Descriptions about the same components as those in the above embodiment 1 will be omitted. The basic configuration and process of the power conversion circuit 20 and the control device 10 according to the present embodiment are the same as those in embodiment 1.

Figure 10:
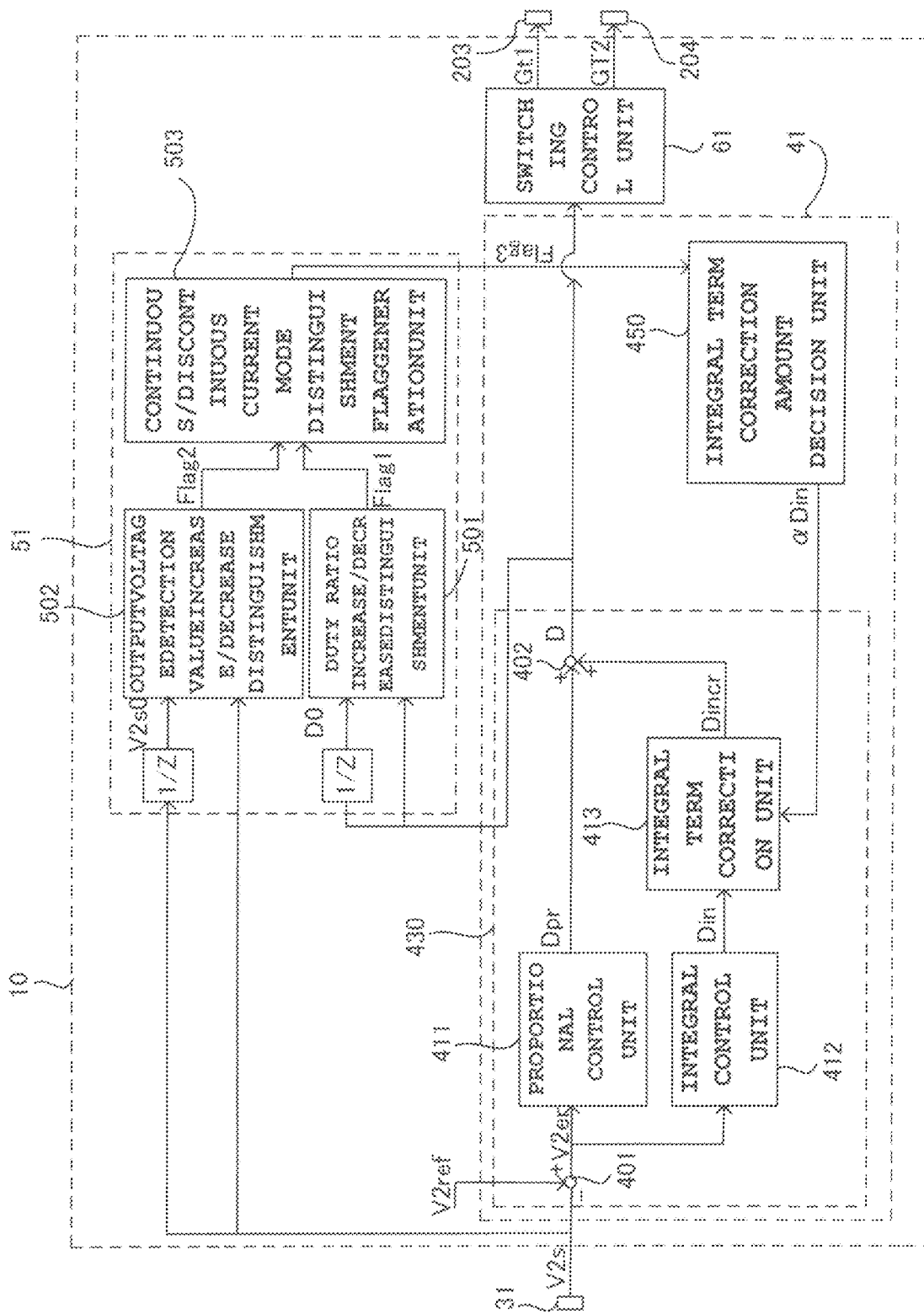
FIG. 10 is a block configuration diagram showing functions of a control device according to embodiment 3.

FIG. 10 is a block configuration diagram showing functions of the control device according to the present embodiment. The feedback control unit 41 includes an integral term correction amount decision unit 450 which decides a present value Din of an integral term correction amount. The PI controller 430 includes an integral term correction unit 413 which corrects the integral term Din and outputs a corrected integral term Dincr.

The integral term correction amount decision unit 450 decides the present value αDin of the integral term correction amount on the basis of the result from the continuous/discontinuous current mode distinguishment unit 51. The integral term correction unit 413 stores therein the present value αDin of the integral term correction amount. Further, the integral term correction unit 413 corrects the integral term Din by multiplying the integral term (integral duty ratio) Din by a previous value αDin0 of the integral term correction amount and outputs a corrected integral term Dincr to the adder 402.

If the previous value αDin0 of the integral term correction amount is 1, integral term correction control is turned off. The adder 402 adds the proportional term Dpr and the corrected integral term Dincr, and outputs a duty ratio D.

Figure 11:
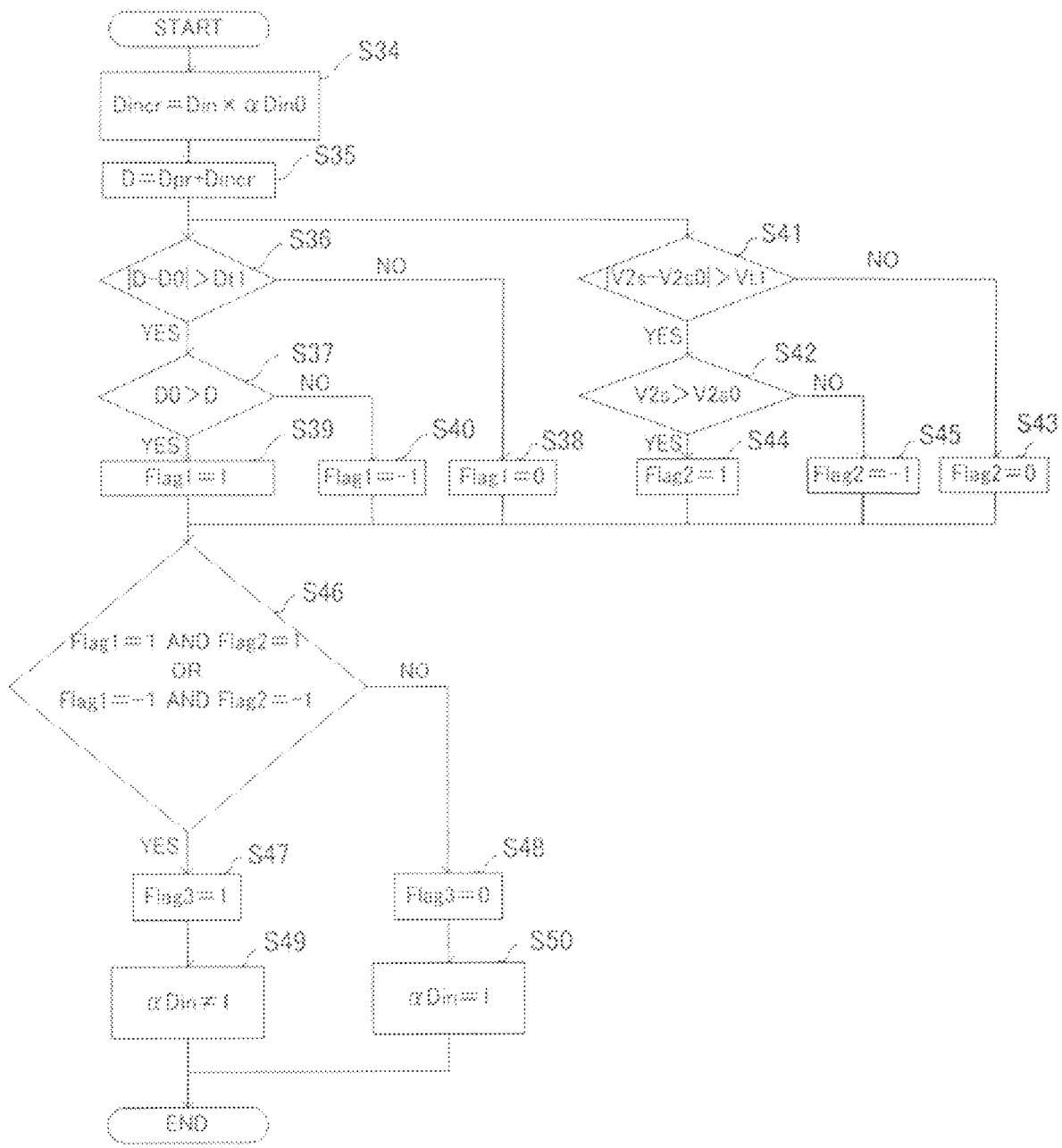
FIG. 11 is a flowchart explaining continuous/discontinuous current mode distinguishment and a process subsequent to the distinguishment, in the control device according to embodiment 3.

FIG. 11 is a flowchart explaining continuous/discontinuous current mode distinguishment and a process subsequent to the distinguishment, in embodiment 3. FIG. 11 shows: a continuous/discontinuous current mode distinguishment process performed by the continuous/discontinuous current mode distinguishment unit. 51; and a process that is performed by the integral term correction amount decision unit 450 and the integral term correction unit 413 and that is subsequent to the distinguishment.

In FIG. 11, in step S34, the integral term correction unit 413 multiplies the integral term Din by the previous value αDin0 of the integral term correction amount and outputs the corrected integral term Dincr.

In step S35, the adder 402 adds the proportional term Dpr and the corrected integral term Dincr, and outputs the duty ratio D. In the present embodiment, only the integral term Din is corrected, and the proportional term Dpr is not corrected. The reason for this is as follows. A case of directly correcting the duty ratio has been described in embodiment 2, and, out of elements composing this duty ratio, the proportional term is an instantaneous value, and the integral term is a value resulting from adding up, over time, products each obtained by multiplying a deviation at the corresponding time by the integral gain and the control cycle. An advantageous effect of the present disclosure is able to suppress the maximum value of the second terminal voltage V2, whereby the capacitance of the smoothing capacitor 205 on the second terminal side can be decreased owing to this advantageous effect. With this premise, it is necessary that the duty ratio is rapidly decreased in order to suppress the maximum value of the second terminal voltage. An effective means to achieve this rapid decrease is to correct, rather than an instantaneously decided proportional term, an integral term obtained by accumulation having already been performed.

Next, in step S36, the continuous/discontinuous current mode distinguishment unit 51 calculates the absolute value of the difference between the duty ratio D and the previous value D0 of the duty ratio. If the absolute value is determined to be larger than the first duty ratio threshold value Dt1, the process is advanced to step S37. Meanwhile, if the absolute value is determined to be smaller than the first duty ratio threshold value Dt1, the process is advanced to step S38.

In step S37, the continuous/discontinuous current mode distinguishment unit 51 checks the relationship in magnitude between the duty ratio D and the previous value D0 of the duty ratio. If D0 is larger than D, the process is advanced to step S39. Meanwhile, if D0 is smaller than D, the process is advanced to step S40.

In step S38, the duty ratio increase/decrease distinguishment unit 501 in the continuous/discontinuous current mode distinguishment unit 51 sets the duty ratio increase/decrease distinguishment flag Flag1 to be 0.

In step S39, the duty ratio increase/decrease distinguishment unit 501 sets the duty ratio increase/decrease distinguishment flag Flag1 to be 1.

In step S40, the duty ratio increase/decrease distinguishment unit 501 sets the duty ratio increase/decrease distinguishment flag Flag1 to be −1.

In step S4.1, the continuous/discontinuous current mode distinguishment unit 51 calculates the absolute value of the difference between the detection value V2s of the second terminal voltage and the previous value V2s0 of the detection value of the second terminal voltage. If the absolute value is determined to be larger than the first output voltage threshold value Vt1, the process is advanced to step S42. Meanwhile, if the absolute value is determined to be smaller than the first output voltage threshold value Vt1, the process is advanced to step S43.

In step S42, the continuous/discontinuous current mode distinguishment unit 51 checks the relationship in magnitude between the detection value V2s of the second terminal voltage and the previous value V2s0 of the detection value of the second terminal voltage. If V2s is larger than V2s0, the process is advanced to step S44. Meanwhile, if V2s is smaller than V2s0, the process is advanced to step S45.

In step S43, the output voltage detection value increase/decrease distinguishment unit 502 in the continuous/discontinuous current mode distinguishment unit 51 sets the output voltage detection value increase/decrease distinguishment flag Flag2 to be 0.

In step S44, the output voltage detection value increase/decrease distinguishment unit 502 sets the output voltage detection value increase/decrease distinguishment flag Flag2 to be 1.

In step S45, the output voltage detection value increase/decrease distinguishment unit 502 sets the output voltage detection value increase/decrease distinguishment flag Flag2 to be −1.

In step S46, whether the operation status of the circuit is the continuous current mode or the discontinuous current mode is determined on the basis of: the duty ratio increase/decrease distinguishment flag Flag1 decided in step S39, step S40, or step S38; and the output voltage detection value increase/decrease distinguishment flag Flag2 decided in step S44, step S45, or step S43. In the case in which both the duty ratio increase/decrease distinguishment flag Flag1 and the output voltage detection value increase/decrease distinguishment flag Flag2 are 1 or −1, the operation status of the circuit is determined to be the discontinuous current mode, and the process is advanced to step S47. In the other cases, the operation status of the circuit is determined to be the continuous current mode, and the process is advanced to step S48.

In step S47, the continuous/discontinuous current mode distinguishment flag generation unit 503 in the continuous/discontinuous current mode distinguishment unit 51 sets the continuous/discontinuous current mode distinguishment flag Flag3 to be 1 (ON), and the process is advanced to step S49.

In step S48, the continuous/discontinuous current mode distinguishment flag generation unit 503 sets the continuous/discontinuous current mode distinguishment flag Flag3 to be 0 (OFF), and the process is advanced to step S50.

In step S49, the integral term correction amount decision unit 450 outputs an integral term correction amount αDin other than 1 to the integral term correction unit 413.

The manner for setting the integral term correction amount αDin will be described below. The integral term correction amount αDin is set to become a value larger than a maximum value of a change, in the duty ratio D, that occurs per one control cycle Tcnt with respect to a maximum speed of a circuit sudden chance that occurs in the power conversion circuit 20. For example, if the mode of the load 81 is changed from the power-running mode to the regeneration mode in a state in which the second terminal voltage V2 and the first terminal voltage V1 are fixed, the duty ratio D decreases for the switching element 203 by the amount that is two times the dead time ΔDt. Meanwhile, if the mode of the load 81 is changed from the regeneration mode to the power-running mode, the duty ratio D increases for the switching element 203 by the amount that is two times the dead time ΔDt, Conversion into an integral term is performed on the assumption that the duty ratio D changes by 2×ΔDt in one control cycle Tcnt. Consequently, a maximum value of the integral term correction amount αDin is decided.

In step S50, the integral term correction amount decision unit 450 outputs 1 as the integral term correction amount αDin to the integral term correction unit 413.

When a sudden change in the load occurs in the present embodiment, the same control behavior as that shown in FIG. 9 is obtained.

By configuring the power coversion device as described above, distinguishment between the continuous current mode and the discontinuous current mode can be performed without using any detection value of reactor current, whereby the distinguishment can be performed accurately. Further, the feedback control unit 41 performs feedback control on the basis of a result of this distinguishment. Therefore, the responsiveness of the power conversion circuit 20 can be increased, and the maximum value of the second terminal voltage V2 can be suppressed. Consequently, the capacitance of the smoothing capacitor 205 on the second terminal side can be decreased.

Embodiment 4

Components in each of the embodiments described below can be not only used singly but also used in combination with components in another embodiment unless any contradiction arises.

In the above embodiments, description has been given by taking, as an example, a case in which the power conversion circuit 20 is formed as a bidirectional chopper circuit in which a step-up chopper circuit for stepping up DC voltage from the first terminals 21 to the second terminals 22 and a step-down chopper circuit for stepping down DC voltage from the second terminals 22 to the first terminals 21 are combined with each other. However, embodiments of the present disclosure are not limited thereto. Specifically, any type of power conversion circuit may be used as the power conversion circuit 20 as long as the circuit includes switching elements and performs power conversion between the first terminals 21 and the second terminals 22. For example, the power conversion circuit 20 may be a step-up chopper circuit for stepping up DC voltage from the first terminals 21 to the second terminals 22 or may be a step-down chopper circuit for stepping down DC voltage from the first terminals 21 to the second terminals 22. Farther, the power conversion circuit 20 may be an insulation-type power conversion circuit including an insulation transformer or may be a power conversion circuit in which a plurality of power conversion circuit elements are arranged in an interleaved manner or in parallel.

In the above embodiments, description has been given by taking, as an example, a case in which the power supply 71 is connected to the first terminals 21, and the load 81 composed of the inverter and the motor is connected to the second terminals 22. However, embodiments of the present disclosure are not limited thereto. Specifically, a power supply or a load only has to be connected to the first terminals 21, and a power supply or a load only has to be connected to the second terminals 22. As the power supply and the load, any type of power supply and load can be used.

In the above embodiments, description has been given by taking, as an example, a case in which the feedback control unit 41 calculates the duty ratio D or the corrected duty ratio Dcr on the basis of a command value and a detection value of the second terminal voltage V2. However, embodiments of the present disclosure are not limited thereto. Specifically, a command value and a detection value of another type of electrical information may be used in the feedback control unit 41 as long as the electrical information is related to the power conversion circuit 20. For example, voltage, current, or power that are inputted to or outputted from the first terminals 21 or the second terminals 22 may be used in the feedback control unit 41 as the electrical information related to the power conversion circuit 20.

In the above embodiments, description has been given by taking, as an example, a case in which the duty ratio increase/decrease distinguishment unit 501 decides the duty ratio increase/decrease distinguishment flag Flag1 on the basis of the previous value Dr of the duty ratio and the duty ratio D in embodiment 1 or on the basis of the previous value Dcr0 of the corrected duty ratio and the corrected duty ratio Dcr in embodiment 2. However, embodiments of the present disclosure are not limited thereto.

Specifically, a duty ratio Dfilt resulting from any type of smoothing process such as a low-pass filtering process or a moving-average process can be used instead of the previous value D0 of the duty ratio. Further, a corrected duty ratio Dcrfilt resulting from any type of smoothing process such as the low-pass filtering process or the moving-average process can be used instead of the previous value Dcr0 of the corrected duty ratio. Moreover, the duty ratio Dfilt resulting from any type of smoothing process such as the low-pass filtering process or the moving-average process can be used instead of the present value D of the duty ratio, and a previous value Dfilt0 of the duty ratio Dfilt resulting from any type of smoothing process such as the low-pass filtering process or the moving-average process can be used instead of the previous value D0 of the duty ratio. That is, a value resulting from the moving-average process can be used as at least one value out of a duty ratio measured at a previous time and a duty ratio measured at a present time. Further, a value resulting from the low-pass filtering process can be used as at least one value out of the duty ratio measured at the previous time and the duty ratio measured at the present time. Further, the value resulting from the moving-average process can be used as at least one value out of a corrected duty ratio obtained at a previous time and a corrected duty ratio obtained at a present time. Further, the value resulting from the low-pass filtering process can be used as at least one value out of the corrected duty ratio obtained at the previous time and the corrected duty ratio obtained at the present time.

When the status of the circuit is switched from the continuous current mode to the discontinuous current mode (in particular, when a change from the power-running mode to the regeneration mode is made), an overshoot occurs in a duty ratio decided according to the detection value of the second terminal voltage. Strictly speaking, however, a completely monotonic increase is hindered by ripple of reactor current or the like. Therefore, erroneous distinguishment might occur when distinguishment is performed by using only a present value and a previous value. therefore, the moving-average process or the low-pass filtering process is performed with respect to the duty ratio. Consequently, these values can be smoothed, and this leads to improvement in the accuracy of distinguishment.

Specific methods for the processes are as follows. In each embodiment, the moving-average process is such that a present value and a previous value (and optionally, a value preceding the previous value) of the duty ratio are averaged, and the previous value in each of embodiments 1 to 3 is substituted with the value resulting from the moving-average process, whereby mode distinguishment can be performed according to the difference between the present value and the value resulting from the moving-average process. Further, the present value in each of embodiments 1 to 3 is substituted with the value resulting from the moving-average process, and the previous value in each of embodiments 1 to 3 is substituted with a previous value resulting from the moving-average process, whereby mode distinguishment can be performed according to the difference between both values.

Meanwhile, in each embodiment, the low-pass filtering process is such that low-pass filtering is performed after the duty ratio is outputted, and the previous value in each of embodiments 1 to 3 is substituted with the value resulting from the low-pass filtering process, whereby mode distinguishment can be performed according to the change difference between the present value and the value resulting from the low-pass filtering process. Further, the present value in each of embodiments 1 to 3 is substituted with the value resulting from the low-pass filtering process, and the previous value in each of embodiments 1 to 3 is substituted with a previous value resulting from the low-pass filtering process, whereby mode distinguishment can be performed according to the difference between both values.

In the above embodiments, description has been given by taking, as an example, a case in which the output voltage detection value increase/decrease distinguishment unit 502 decides the output voltage detection value increase/decrease distinguishment flag Flag2 on the basis of the previous value V2s0 of the detection value of the second terminal voltage and the detection value V2s of the second terminal voltage. However, embodiments of the present disclosure are not limited thereto. Specifically, a detection value V2sfilt, of the second terminal voltage, resulting from any type of smoothing process such as the low-pass filtering process or the moving-average process can be used instead of the previous value V2s0 of the detection value of the second terminal voltage.

Further, the detection value V2sfilt, of the second terminal voltage, resulting from any type of smoothing process such as the low-pass filtering process or the moving-average process can be used instead of the present value V2s of the detection value of the second terminal voltage, and a previous value V29filt0 of the detection value V2sfilt, of the second terminal voltage, resulting from any type of smoothing process such as the low-pass filtering process or the moving-average process can be used instead of the previous value V2s0 of the detection value of the second terminal voltage. That is, the value resulting from the moving-average process can be used as at least one value out of a detection value measured at a previous time and a detection value measured at a present time. Further, the value resulting from the low-pass filtering process can be used as at least one value out of the detection value measured at the previous time and the detection value measured at the present time.

When the status of the circuit is switched from the continuous current mode to the discontinuous current mode (in particular, when a change from the power-running mode to the regeneration mode is made), an overshoot occurs in the detection value of the second terminal voltage. Strictly speaking, however, a completely monotonic increase is hindered owing to ripple of reactor current or the like. Therefore, erroneous distinguishment might occur when distinguishment is performed by using only a present value and a previous value. If the moving-average process or the low-pass filtering process is performed with respect to detection values of the second terminal voltage, these values can be smoothed, and this leads to improvement in the accuracy of distinguishment.

Specific methods for the processes are as follows. In each embodiment, the moving-average process is such that a present value and a previous value (and optionally, a value preceding the previous value) of the detection value of the second terminal voltage are averaged, and the previous value in each of embodiments 1 to 3 is substituted with the value resulting from the moving-average process, whereby mode distinguishment can be performed according to the difference between the present value and the value resulting from the moving-average process. Further, the present value in each of embodiments 1 to 3 is substituted with the value resulting from the moving average process, and the previous value in each of embodiments 1 to 3 is substituted with the previous value resulting from the moving-average process, whereby mode distinguishment can be performed according to the difference between both values.

Meanwhile, in each embodiment, the low-pass filtering process is such that low-pass filtering is performed after the detection value of the second terminal voltage is outputted, and the previous value in each of embodiments 3 to 3 is substituted with the value resulting from the low-pass filtering process, whereby mode distinguishment can be performed according to the difference between the present value and the value resulting from the low-pass filtering process. Further, the present value in each of embodiments 1 to 3 is substituted with the value resulting from the low-pass filtering process, and the previous value in each of embodiments 1 to 3 is substituted with the previous value resulting from the low-pass filtering process, whereby mode distinguishment can be performed according to the difference between both values.

In the above embodiment 2, description has been given by taking, as an example, a case in which the duty ratio correction unit 442 corrects the duty ratio D by multiplying the duty ratio D by the previous value $\alpha D0$ of the duty ratio correction amount and outputs a corrected duty ratio Dcr.

However, embodiments of the present disclosure are not limited thereto. Specifically, the duty ratio correction unit 442 may correct the duty ratio D by adding the previous value αD0 of the duty ratio correction amount and the duty ratio D, and output a corrected duty ratio Dcr.

In the above embodiment 3, description has been given by taking, as an example, a case in which the integral term correction unit 413 corrects the integral term Din by multiplying the integral term Din by the previous value αDin0 of the integral term correction amount and outputs a corrected integral term Dincr. However, embodiments of the present disclosure are not limited thereto. Specifically, the integral term correction unit 413 may correct the integral term Din by adding the previous value αDin0 of t integral term correction amount and the integral term Din, and output a corrected integral term Dincr.

In the above embodiments, description has been given by taking, as an example, a case in which no detection value of reactor current is used at all in the method for distinguishment between the continuous current mode and the discontinuous current mode. However, embodiments of the present disclosure are not limited thereto. Specifically, a reactor current value serving as a boundary between the continuous current mode and the discontinuous current mode and obtained in consideration of a maximum error in the current sensor may be added as a threshold value to distinguishment conditions for the continuous/discontinuous current mode distinguishment flag. Consequently, the accuracy of distinguishment between the continuous current mode and the discontinuous current mode can be improved.

The continuous current mode and the discontinuous current mode are physically distinguished from each other according to a movement in reactor current. Therefore, in an ideal condition in which influence of errors in the current sensor can be ignored, it is preferable that distinguishment between the continuous current mode and the discontinuous current mode is performed by using reactor current. However, in a practical condition in which influence of errors in the current sensor cannot be ignored, influence of errors in the current sensor becomes significant with respect to the reactor current value serving as the boundary between the continuous current mode and the discontinuous current mode, and it is difficult to use only the reactor current as a criterion for distinguishment.

Meanwhile, in the above embodiments, by using the duty ratio and the detection value of the second terminal voltage, it is possible to perform distinguishment without receiving influence of the current sensor. But erroneous distinguishment might occur as described above.

In view of the above two backgrounds, a boundary, between the continuous current mode and the discontinuous current mode, that is obtained in consideration of influence of the current sensor is used as a third distinguishment condition instead of a physically-decided boundary between the continuous current mode and the discontinuous current mode. Consequently, it is possible to improve the accuracy of distinguishment between the continuous current mode and the discontinuous current mode while eliminating influence of the current sensor.

A specific method for the process is as follows. In each embodiment, a value obtained in consideration of a maximum error in the current sensor is taken into account as a physically-decided threshold value between the continuous current mode and the discontinuous current mode, a distinguishment flag that is set to be 1 (ON) if the detection value of reactor current is smaller than the threshold value and that is set to be 0 (OFF) if the detection value is larger than the threshold value, is added. And, if this distinguishment flag is ON and Flag3 is ON, the operation mode is determined to be the discontinuous current mode.

Although the disclosure is described above in terms of various exemplary embodiments and implementations, it should be understood that the various features, aspects, and functionality described in one or more of the individual embodiments are not limited in their applicability to the particular embodiment with which they are described, but they can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

10 control device
20 power conversion circuit
21 first terminal
22 second terminal
41 feedback control unit
51 continuous/discontinuous current mode distinguishment unit
203, 204 switching element
413 integral term correction unit
420 control constant change unit
430 PI controller
440 duty ratio correction control unit
441 duty ratio correction amount decision unit
442 duty ratio correction unit.
450 integral term correction amount decision uni
501 duty ratio increase/decrease distinguishment unit
502 output voltage detection value increase/decrease distinguishment unit

The invention claimed is:

1. A control device for a power conversion circuit in which switching elements and a reactor are connected between first terminals and second terminals and which performs power conversion between the first terminals and the second terminals, the control device comprising:
feedback control circuitry including a controller which calculates a duty ratio for the switching elements on the basis of a command value and a detection value of electrical information related to the power conversion circuit; and
continuous/discontinuous current mode distinguishment circuitry including
duty ratio increase/decrease distinguishment circuitry which performs distinguishment between increase and decrease in the duty ratio, and
output voltage detection value increase/decrease distinguishment circuitry which performs distinguishment between increase and decrease in a detection value of a voltage of the second terminals, wherein if
the duty ratio increase/decrease distinguishment circuitry determines that a duty ratio measured at a previous time is larger than a duty ratio measured at a present time, and the output voltage detection value increase/decrease distinguishment circuitry determines that a detection value measured at the present time is larger than a detection value measured at the previous time, or if the duty ratio increase/decrease distinguishment circuitry determines that the duty ratio measured at the previous time is smaller than the duty ratio measured at the present time, and the output voltage detection value increase/decrease distinguishment circuitry determines that the detection value measured at the present time is smaller than the detection value measured at the previous time, the continuous/discontinuous current mode distinguishment circuitry determines that an operation mode of the circuit is a discontinuous current mode, and feeds back a result of the determination to the feedback control circuitry.

2. The control device for the power conversion circuit, according to claim 1, wherein the feedback control circuitry includes a control constant change circuitry which changes a control constant for using in the controller, the controller stores therein the control constant outputted from the control constant change circuitry and calculates the duty ratio by using a previous value of the control constant, and if the duty ratio increase/decrease distinguishment circuitry determines that an absolute value of a difference between the duty ratio measured at the present time and the duty ratio measured at the previous time is larger than a first duty ratio threshold value and the duty ratio measured at the previous time is larger than the duty ratio measured at the present time, and the output voltage detection value increase/decrease distinguishment circuitry determines that an absolute value of a difference between the detection value measured at the present time and the detection value measured at the previous time is larger than a first output voltage threshold value and the detection value measured at the present time is larger than the detection value measured at the previous time, or if the duty ratio increase/decrease distinguishment circuitry determines that the absolute value of the difference between the duty ratio measured at the present time and the duty ratio measured at the previous time is larger than the first duty ratio threshold value and the duty ratio measured at the previous time is smaller than the duty ratio measured at the present time, and the output voltage detection value increase/decrease distinguishment circuitry determines that the absolute value of the difference between the detection value measured at the present time and the detection value measured at the previous time is larger than the first output voltage threshold value and the detection value measured at the present time is smaller than the detection value measured at the previous time, the continuous/discontinuous current mode distinguishment circuitry determines that the operation mode of the circuit is the discontinuous current mode, and the control constant change circuitry decides the control constant on the basis of a result of the determination.

3. The control device for the power conversion circuit, according to claim 2, wherein a value resulting from a moving-average process is used as at least one value out of the duty ratio measured at the previous time and the duty ratio measured at the present time.

4. The control device for the power conversion circuit, according to claim 3, wherein a value resulting from a moving-average process is used as at least one value out of the detection value measured at the previous time and the detection value measured at the present time.

5. The control device for the power conversion circuit, according to claim 2, wherein a value resulting from a low-pass filtering process is used as at least one value out of the duty ratio measured at the previous time and the duty ratio measured at the present time.

6. The control device for the power conversion circuit, according to claim 5, wherein a value resulting from a moving-average process is used as at least one value out of the detection value measured at the previous time and the detection value measured at the present time.

7. The control device for the power conversion circuit, according to claim 2, wherein a value resulting from a moving-average process is used as at least one value out of the detection value measured at the previous time and the detection value measured at the present time.

8. The control device for the power conversion circuit, according to claim 1, wherein the feedback control circuitry includes duty ratio correction amount decision circuitry which decides a value of a duty ratio correction amount, and duty ratio correction circuitry which corrects the duty ratio and which outputs a corrected duty ratio, the duty ratio correction circuitry stores therein the duty ratio correction amount measured at a present time and calculates the corrected duty ratio by multiplying the duty ratio by the duty ratio correction amount measured at a previous time, and if the duty ratio increase/decrease distinguishment circuitry determines that an absolute value of a difference between a corrected duty ratio obtained at a present time and a corrected duty ratio obtained at a previous time is larger than a second duty ratio threshold value and the corrected duty ratio obtained at the previous time is larger than the corrected duty ratio obtained at the present time, and the output voltage detection value increase/decrease distinguishment circuitry determines that the absolute value of the difference between the detection value measured at the present time and the detection value measured at the previous time is larger than the first output voltage threshold value and the detection value measured at the present time is larger than the detection value measured at the previous time, or if the duty ratio increase/decrease distinguishment circuitry determines that the absolute value of the difference between the corrected duty ratio obtained at the present time and the corrected duty ratio obtained at the previous time is larger than the second duty ratio threshold value and the corrected duty ratio obtained at the previous time is smaller than the corrected duty ratio obtained at the present time, and the output voltage detection value increase/decrease distinguishment circuitry determines that the absolute value of the difference between the detection value measured at the present time and the detection value measured at the previous time is larger than the first output voltage threshold value and the detection value measured at the present time is smaller than the detection value measured at the previous time, the continuous/discontinuous current mode distinguishment circuitry determines that the operation mode of the circuit is the discontinuous current mode, and the duty ratio correction amount decision circuitry decides a value of the duty ratio correction amount on the basis of a result of the determination.

9. The control device for the power conversion circuit, according to claim 8, wherein a value resulting from a moving-average process is used as at least one value out of the corrected duty ratio obtained at the previous time and the corrected duty ratio obtained at the present time.

10. The control device for the power conversion circuit, according to claim 9, wherein a value resulting from a moving-average process is used as at least one value out of the detection value measured at the previous time and the detection value measured at the present time.

11. The control device for the power conversion circuit, according to claim 8, wherein a value resulting from a low-pass filtering process is used as at least one value out of the corrected duty ratio obtained at the previous time and the corrected duty ratio obtained at the present time.

12. The control device for the power conversion circuit, according to claim 8, wherein a value resulting from a moving-average process is used as at least one value out of the detection value measured at the previous time and the detection value measured at the present time.

13. The control device for the power conversion circuit, according to claim 1, wherein the feedback control circuitry includes proportional control circuitry which outputs a proportional term on the basis of the command value and the detection value, integral control circuitry which outputs an integral term on the basis of the command value and the detection value, integral term correction amount decision circuitry which decides an integral term correction amount for correcting the integral term, integral term correction circuitry which stores therein a present value of the integral term correction amount and which calculates a corrected integral term by multiplying the integral term by a previous value of the integral term correction amount, and an adder which adds the proportional term and the corrected integral term, and outputs the duty ratio, and if the duty ratio increase/decrease distinguishment circuitry determines that an absolute value of a difference between the duty ratio measured at the present time and the duty ratio measured at the previous time is larger than the first duty ratio threshold value and the duty ratio measured at the previous time is larger than the duty ratio measured at the present time, and the output voltage detection value increase/decrease distinguishment circuitry determines that an absolute value of a difference between the detection value measured at the present time and the detection value measured at the previous time is larger than the first output voltage threshold value and the detection value measured at the present time is larger than the detection value measured at the previous time, or if the duty ratio increase/decrease distinguishment circuitry determines that the absolute value of the difference between the duty ratio measured at the present time and the duty ratio measured at the previous time is larger than the first duty ratio threshold value and the duty ratio measured at the previous time is smaller than the duty ratio measured at the present time, and the output voltage detection value increase/decrease distinguishment circuitry determines that the absolute value of the difference between the detection value measured at the present time and the detection value measured at the previous time is larger than the first output voltage threshold value and the detection value measured at the present time is smaller than the detection value measured at the previous time, the continuous/discontinuous current mode distinguishment circuitry determines that the operation mode of the circuit is the discontinuous current mode, and the integral term correction amount decision circuitry decides the integral term correction amount on the basis of a result of the determination.

14. The control device for the power conversion circuit, according to claim 13, wherein a value resulting from a moving-average process is used as at least one value out of the duty ratio measured at the previous time and the duty ratio measured at the present time.

15. The control device for the power conversion circuit, according to claim 13, wherein a value resulting from a low-pass filtering process is used as at least one value out of the duty ratio measured at the previous time and the duty ratio measured at the present time.

16. The control device for the power conversion circuit, according to claim 13, wherein
a value resulting from a moving-average process is used as at least one value out of the detection value measured at the previous time and the detection value measured at the present time.

17. The control device for the power conversion circuit, according to claim 1, wherein
a value resulting from a moving-average process is used as at least one value out of the detection value measured at the previous time and the detection value measured at the present time.

18. The control device for the power conversion circuit, according to claim 1, wherein
a value resulting from a low-pass filtering process is used as at least one value out of the detection value measured at the previous time and the detection value measured at the present time.

19. The control device for the power conversion circuit, according to claim 1, wherein
if determination that the operation mode is the discontinuous current mode is made two or more times, the continuous/discontinuous current mode distinguishment circuitry concludes that the operation mode is the discontinuous current mode.

20. The control device for the power conversion circuit, according to claim 1, wherein
the electrical information is
voltage, current, or power that are inputted to the first terminals, or
voltage, current, or power that are outputted from the second terminals.

* * * * *